(12) United States Patent
Boyle et al.

(10) Patent No.: US 12,136,132 B2
(45) Date of Patent: Nov. 5, 2024

(54) SYSTEMS AND METHODS FOR DETECTING AND REPORTING ANOMALIES IN UTILITY METERS

(71) Applicant: Xylem Vue Inc., Rye Brook, NY (US)

(72) Inventors: Christine E. Boyle, Stateline, NV (US); Renee Jutras, San Francisco, CA (US); M. Sohaib Alam, Freehold, NJ (US); David R. Wegman, San Francisco, CA (US)

(73) Assignee: Xylem Vue Inc., Rye Brook, NY (US)

( * ) Notice: Subject to any disclaimer, the term of this patent is extended or adjusted under 35 U.S.C. 154(b) by 30 days.

(21) Appl. No.: 18/128,298

(22) Filed: Mar. 30, 2023

(65) Prior Publication Data
US 2023/0237596 A1    Jul. 27, 2023

Related U.S. Application Data

(63) Continuation of application No. 16/488,946, filed as application No. PCT/US2018/024240 on Mar. 26, 2018, now Pat. No. 11,645,727.
(Continued)

(51) Int. Cl.
| G06Q 50/06 | (2024.01) |
| G06F 16/29 | (2019.01) |
| G06Q 20/14 | (2012.01) |

(52) U.S. Cl.
CPC ............. *G06Q 50/06* (2013.01); *G06F 16/29* (2019.01); *G06Q 20/14* (2013.01)

(58) Field of Classification Search
CPC ......... G06Q 50/06; G06Q 20/14; G06F 16/29
(Continued)

(56) References Cited

U.S. PATENT DOCUMENTS

| 2007/0179737 A1 | 8/2007 | Kalokitis et al. |
| 2007/0247789 A1 | 10/2007 | Benson et al. |
| 2012/0232915 A1* | 9/2012 | Bromberger ........... G01D 4/004 |
| | | 705/1.1 |

(Continued)

FOREIGN PATENT DOCUMENTS

| CA | 2818696 A1 | 5/2012 |
| EP | 2704081 A1 | 3/2014 |

(Continued)

OTHER PUBLICATIONS

Hamoudi, M. et al. "GeoForschungsZentrum Anomaly Magnetic Map (GAMMA): A Candidate Model for the World Digital Magnetic Anomaly Map." Geochemistry, geophysics, geosystems: G3 8.6 (2007): 006023-n/a. Web. (Year: 2007).
(Continued)

*Primary Examiner* — Akiba K Robinson
(74) *Attorney, Agent, or Firm* — Stanek Lemon Crouse & Meeks, PA

(57) ABSTRACT

Systems and methods for utility intervention are disclosed. The method of utility intervention includes: (i) obtaining utility data from a utility data repository; (ii) detecting, using at least one type of anomaly-detecting module, at least one utility anomaly and a location address; (iii) calculating an amount of financial savings for the utility anomaly if the utility anomaly was remedied or addressed; (iv) computing a certainty score for the utility anomaly; (v) conveying information about the type of utility anomaly, and the location address of the utility anomaly; and (vi) displaying, on a display screen of a client device, a map depicting a geographical area that identifies, using a flag icon, the location address on the map of the utility anomaly, the type of the utility anomaly, a certainty score for the utility anomaly, and/or an amount of financial savings associated with the utility anomaly.

19 Claims, 23 Drawing Sheets

Related U.S. Application Data

(60) Provisional application No. 62/478,831, filed on Mar. 30, 2017.

(58) Field of Classification Search
USPC .......................................................... 705/412
See application file for complete search history.

(56) References Cited

U.S. PATENT DOCUMENTS

| | | | |
|---|---|---|---|
| 2013/0151979 A1* | 6/2013 | Snider .................. | G06F 3/0484 715/738 |
| 2013/0271289 A1 | 10/2013 | Hampapur et al. | |

FOREIGN PATENT DOCUMENTS

| | | | |
|---|---|---|---|
| KR | 10-2008-0005694 A | | 1/2008 |
| KR | 10-2014-0004127 A | | 1/2014 |
| KR | 20140004127 A | * | 1/2014 |
| KR | 10-2014-0145637 A | | 12/2014 |
| WO | WO-02063542 A2 | | 8/2002 |

OTHER PUBLICATIONS

Yoon, Man-Ki et al. "Memory Heat Map: Anomaly Detection in Real-Time Embedded Systems Using Memory Behavior." Proceedings of the 52nd Annual Design Automation Conference. ACM, 2015. 1-6. Web. (Year: 2015).

Extended European Search Report for EP Application No. 18777221.5 dated Jul. 28, 2020, 4 pages.

International Search Report and Written Opinion received for International Application No. PCT/US2018/024240 mailed on Jul. 13, 2018, 19 pages.

* cited by examiner

SYSTEMS AND METHODS FOR DETECTING AND REPORTING ANOMALIES IN UTILITY METERS

RELATED APPLICATION

This application is a continuation application of U.S. patent application Ser. No. 16/488,946, filed on Aug. 27, 2019, which in turn claims priority from an International Application having serial no. PCT/US18/24240, filed on Mar. 26, 2018, which in turn claims priority from U.S. Provisional Application No. 62/478,831, filed on Mar. 30, 2017, and all the aforementioned patent applications are incorporated herein by reference for all purpose.

FIELD

The present teachings and arrangement relate generally to systems and methods for detecting and reporting anomalies in, or related to, utility data meters. More particularly, the present teachings and arrangements relate to systems and methods that analyze water utility data streams from, for example, a utility company and/or external data streams from other sources to detect anomalies in water utility meters installed at a particular location.

BACKGROUND

Water utilities companies serve local communities and deliver water to their customers, which may be individuals, commercial entities, government entities, non-profit entities, or the like. Water utilities track water use by their customers using water utility meters, installed at or near a location associated with customers, and which measure water consumption at that location. Based in part on such measurements of water consumption, a customer is invoiced by the water utility company.

As a byproduct of providing water to their customers, multiple data streams are generated, collected, and/or otherwise available to the water utility companies. These data streams include, but are not limited to, water utility meter data (i.e., data associated with a water meter's measurement of water use at a location); water utility billing data (i.e., data associated with amounts a customer is invoiced for water use at a location), and/or external data (i.e., other types of data, not from a utility company, but related to water use at the customer's location, e.g., climate and weather data, water quality data, or property data, such as square footage, zoning, building age, number of bedrooms at a building on a location, number of bathrooms at a building on a location, number of swimming pools on a particular location, and assessed property value).

Water meters used by water utilities to measure water use at a location often suffer from certain problems that affect water consumption, water measurement, and/or water billing for a particular location. For example, water meters are often too small or too large relative to an amount of water being supplied to a location; water meters are often misclassified based on the class of use at a location (e.g., commercial, residential, or industrial); water meters sometimes under-register an amount of water being delivered to a location; and/or water meters at a location are often tampered with in ways that affect water use, measurement, and/or billing at a location.

Unfortunately, conventional systems and techniques for tracking and/or billing for water consumption lack means to detect anomalies associated with utility water meters (i.e., utility anomalies) that reveal such problems to the water utility company, such that the water utility company may take steps to remediate these defective water utility meters. In particular, conventional techniques fail to make sufficient use of the available data streams to identify anomalies associated with water utility meters that require adjustment, repair, or replacement, and to optimize or otherwise improve measurement of water use and/or water billing at a location.

What is, therefore, needed are novel systems and methods that use data streams available to water utility companies to detect anomalies in water meters, to report such anomalies and related information to the water utility company and/or customer, and to prompt further action by the water utility company to reclassify, adjust, repair, and/or replace water utility meters.

SUMMARY

To achieve the foregoing, the present teachings and arrangements provide systems and methods for utility intervention, which identifies a utility anomaly by analyzing utility data. Once detected, anomalies and/or related information may be reported to the water utility company and/or customer, prompting a water utility company and/or a third-party worker to remediate the water meter producing such anomalies, thus providing certain benefits, including cost savings and energy savings, to the water utility company and/or customer.

In one aspect, the present teachings disclose a method of utility intervention. An exemplar method, of this aspect, includes: (i) obtaining utility data from a utility data repository; (ii) detecting, using at least one type of anomaly-detecting module installed on a server, one or more utility anomalies of at least one type and a location address of one or more of the utility anomalies; (iii) calculating, using the server, an amount of financial savings for at least one of the utility anomalies if the utility anomaly was remedied or addressed, so that said utility anomaly was no longer deemed an anomaly by the server; (iv) computing, using the server, a certainty score for at least one of the utility anomalies, where the certainty score is a measure of certainty that the utility anomaly, obtained from detecting, is indeed an anomaly, and not a false positive result; (v) conveying the certainty score for at least one of the utility anomalies, information about the type of one or more of the utility anomalies, and the location address of one or more of the utility anomalies from the server to a client device, which is communicatively coupled to the server; and (vi) displaying, on a display screen of the client device, a map depicting a geographical area that identifies, using a flag icon, at least one of the location address on the map of one or more of the utility anomalies, the type of at least one of the utility anomalies, a certainty score for each of the utility anomalies, and/or an amount of financial savings associated with each of the utility anomalies.

According to one embodiment of the present teachings, the method of utility intervention includes using a data transformer module to transform the utility data obtained from the utility data repository into an acceptable form, which allows the above-mentioned step of detecting to be carried out. To produce this acceptable form, for example, the location addresses in the utility data may be converted to the same format, and/or timestamps in the utility data may be converted to time values in the same time zone. Preferably, the utility data in acceptable form is stored in a data storage device. Then, the utility data in acceptable form may be obtained from and/or accessed in the data storage device, to the server, to carry out the above-mentioned step of detecting.

According to preferred embodiments of the present teachings, the anomaly-detecting module, used during the above-mentioned step of detecting, includes at least one module chosen from a group comprising meter under-sizing detector, meter over-sizing detector, meter misclassification detector, meter tampering detector, and meter under-registration detector. The meter under-sizing detector may detect whether a utility meter at the location address has a size smaller than a predetermined size for the utility meter. The meter over-sizing detector may detect whether the utility meter at the location address has a size larger than the predetermined size for said utility meter. The meter misclassification detector may detect whether the utility meter at the location address is misclassified. The meter tampering detector may detect whether the utility meter at the location address has been tampered with. The meter under-registration detector may detect whether the utility meter at the location address is under registering the amount of use of the utility at the location address. Preferably, a utility meter measures an amount of use of the utility (e.g., water) at the location address.

According to one preferred embodiment of the present teachings, the above-mentioned step of conveying includes sending the certainty score for at least one of the utility anomalies and the information about the type of one or more of the utility anomalies, from the server to memory, and then preferably, from memory, to a data reporter.

The location address may convey information about a boundary of a habitable area and information about an external area that is outside the habitable area. According to one embodiment of the present teachings, the external area conveys qualitative information about a nature of use of the location address and/or about an extent of consumption of the utility due to the nature of the external area, such that the qualitative information allows user of the client device to deduce an extent of consumption of the utility in the habitable area.

In certain embodiments of the present teachings, the flag is presented as a non-selectable icon on the user interface of the client device. In other embodiments of the present teachings, however, the flag is presented as a selectable icon on the user interface of the client device. Preferably, upon the user's selection of the selectable icon for the flag, information regarding remediation of the utility anomaly is presented. This may include providing instructions for remediating the utility anomaly. This may also include presenting an input region, on the user interface, for receiving remediation information of the utility anomaly.

The method of utility intervention may also include transmitting the remediation information, through a text or an electronic mail address associated with the location address, to present one or more available times to perform remediation at the location address. The method of utility intervention may further include receiving one or more selected available times, for remediation at the location address, from the text or the electronic mail address associated with the location address. The method of utility intervention may further still include conveying the selected available times, to carry out remediation at the location address, to a remediation entity or worker. The method of utility intervention may further still include transforming the display of the flag from a selectable icon to a non-selectable icon and/or transmitting notice, through a text or an electronic email address associated with the location address, that the remediation entity or worker has completed the remediation at the location address.

The method of utility intervention may further include transmitting an estimated value for cost savings, at the location address, resulting from the remediation at the location address, to the client device. Further, a billing statement associated with the location address may provide an estimated value of cost savings, at the location address, resulting from the remediation at the location address.

Systems and methods of the present teachings and arrangements, however, together with additional objects and advantages thereof, will be best understood from the following descriptions of specific embodiments when read in connection with the accompanying figures.

BRIEF DESCRIPTIONS OF THE DRAWINGS

DETAILED DESCRIPTION OF THE INVENTION

Figure 1:
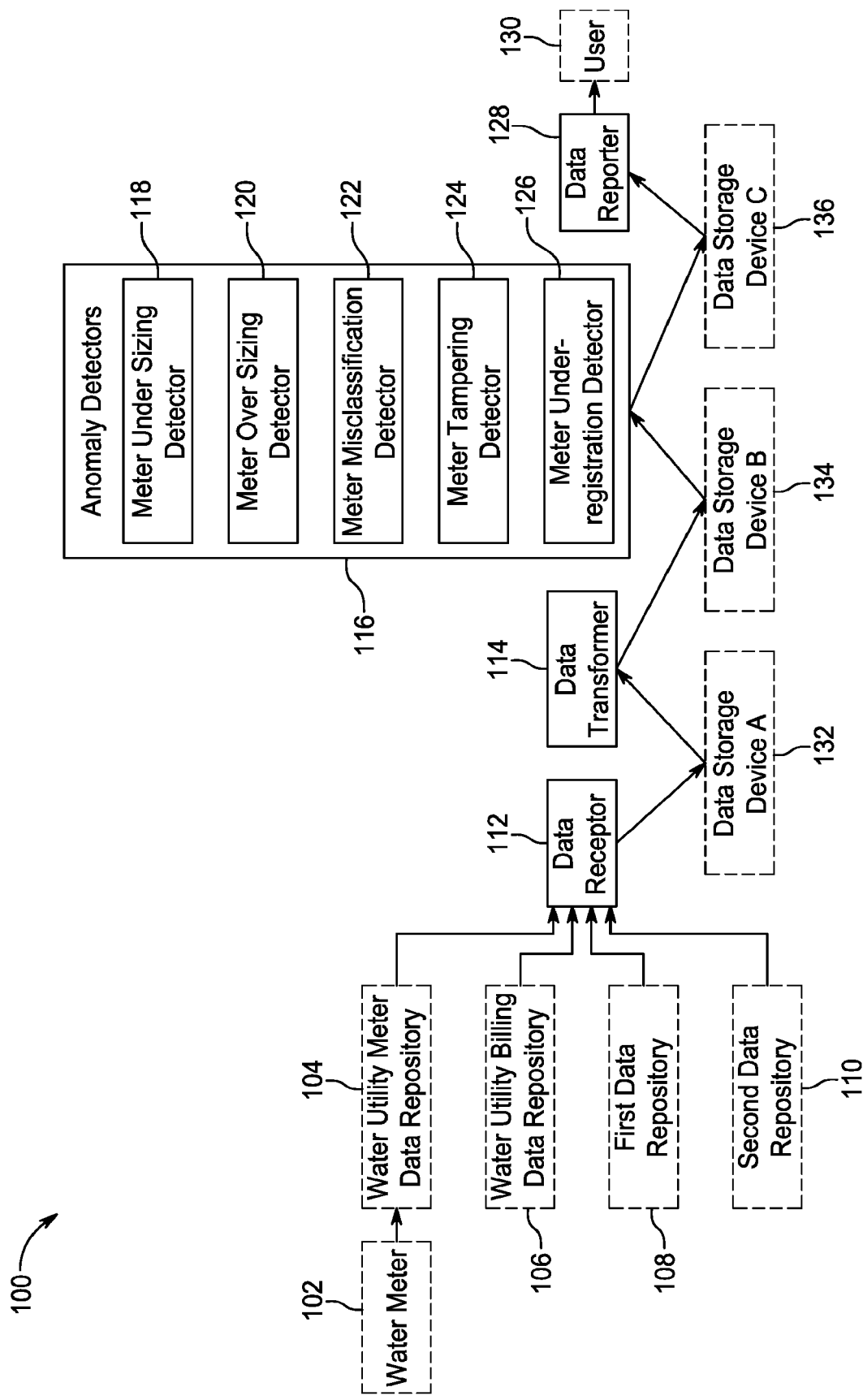
FIG. 1 is a block diagram of a system, according to one embodiment of the present arrangements, for detecting and reporting utility anomalies associated with utility data and/or external data, where system components are depicted within solid lines, and non-system components that deliver inputs to, and receive outputs from, the system are depicted within dashed lines.

The present teachings and arrangements relate to systems and methods of using utility and/or external data streams to detect utility anomalies that a utility company and/or utility customer may be interested in remediating.

Water utilities provide services to a variety of customer classes, including residential, commercial, government, and industrial. Water utilities may be standalone entities or can exist within a larger organization offering other services, including electric or gas. Water utilities may be public or private entities.

Water utilities deliver water to their customers in exchange for fees that comprise revenue to the utility. Water utilities may collect revenue from a variety of fees. Some fees are flat, non-metered fees, without regard to how much of the service is used by the customer. Other fees are metered based on the quantity of service, such as water, that is consumed.

Water utilities calculate the amount that each customer owes, and send each customer an invoice. Invoices may be sent on a recurring basis. The calculated fees can take into account the amount of water registered by a water meter installed at the customer's property, or location. The calculated fees may also take into account information about the water meter that has been installed, such as the size and type of the meter. Moreover, the calculated fees may also take into account information about the customer, such as whether the customer is classified as residential, commercial, or as another class of customer. For example, residential water utility customers may pay a different rate than commercial water utility customers, whether or not they have consumed a different amount of water. In some cases, if water utilities use incorrect information in calculating the amount that a customer owes, they may invoice the customer the wrong amount. Water utilities may be interested in identifying situations when incorrect invoices have been sent out. They can use the information to fix incorrect invoices, either in the past (retroactively), or in the future.

The data generated through the process of delivering water to customers may be used to identify utility anomalies that that reveal certain problems or defects associated with water meters, such as meter over-sizing, meter under-sizing, meter misclassification, meter under-registration, and/or meter tampering. Such problems may also indicate that a past, present, or future invoice is incorrect, and/or that water use at a location is not being accurately measured.

As explained in further detail below, systems of the present arrangements include a set of data receptors, data transformers, anomaly-detecting modules, and data reporters. The data receptors and data transformers collectively provide data streams as inputs to anomaly-detecting modules. Each anomaly-detecting module operates on one or more data streams and produces a list of utility anomalies as outputs. The data reporters provide information about utility anomalies to a user. Each utility anomaly may be based on water utility meter data, water utility billing data, external data, or a combination of multiple types of data.

FIG. 1 is a block diagram showing certain salient components of a system 100, according to one embodiment of the present arrangements, for detecting and reporting utility anomalies. Components in FIG. 1 depicted within solid boundary lines represent components of the present systems for detecting and reporting utility anomalies, while components and/or objects (e.g., data) depicted within dashed boundary lines represent non-system components and/or objects that provide inputs to and/or receive outputs from the present systems for detecting and reporting utility anomalies.

FIG. 1 includes a water meter 102, a water utility meter data repository 104, a water utility billing data repository 106, a first external data repository 108, a second external data repository 110, a data receptor 112, a data transformer 114, anomaly-detecting modules 116 (which include such modules as a meter under-sizing detector module 118, a meter over-sizing detector module 120, a meter misclassification detector module 122, a meter tampering detector module 124, and a meter under-registration detector module 126), a data reporter 128, a user 130, a data storage device A 132, a data storage device B 134, and a data storage device C 136.

A utility may be any utility (e.g., water, electricity, or natural gas) used at a location (e.g., a personal residence or commercial property) where consumption of the utility is measured by a meter. Preferably, a utility is water, with use of the water measured at a location address by a water utility meter installed by a water utility company at or near that location address.

A user (e.g., user 130) is a person or entity to whom information about one or more utility anomalies is delivered (preferably via a client device associated with user 130). The user may be someone at a location address and/or user of a client device. For example, user 130 may be a water utility company, a customer, and/or a third party worker hired to remediate a water utility meter that produces anomalies.

Water meter 102 is a water utility meter, installed at or near a customer's location, for measuring, recording, and/or registering an amount of water used at the customer's location over a period of time. The quantity of water used at the customer, during a period of time, may be obtained by periodically reading the meter. The meter may be read either automatically or manually. The data describing the quantity of water used, i.e., water utility meter data, may be generated by the utility, by one or more third-party providers, or by a combination of the utility and one or more third-party providers.

Water meter 102 is communicatively coupled to water utility meter data repository 104 such that water meter 102 delivers water utility meter data streams to water utility meter data repository 104 for storing and for downstream conveyance of the water utility meter data streams into the present systems for detecting and reporting utility anomalies. As used herein, "communicatively coupled" includes being connected via a network, such as the Internet, an intranet, a cellular network, or a wireless network, as well as being linked by a direct connection (e.g., a wired connection).

As shown in FIG. 1, other types of data repositories may store other types of data as inputs to the present systems for detecting and reporting utility anomalies. For example, water utility billing data repository 106 stores water utility billing data. Water utility billing data reflects the amount of money a customer owes to a water utility in exchange for the utility providing water service. Water utility billing data may take into account the quantity of water consumed during a period of time, in conjunction with other aspects of the customer (e.g., class of customer, location type, meter size, or meter type). Water utility billing data may be generated by the water utility's billing department, by one or more third-party providers, or by a combination of the utility and one or more third-party providers.

System 100 of FIG. 1 also accounts for external sources of data—other than data from a water utility company—that may be used in the present systems for detecting and reporting utility anomalies (i.e., "external data"). To this end, first external data repository 108 and second external data repository 110 each store external data, from third-party sources, that may be related to water meter 102, a customer's property, a location where a water meter has been installed, or another attribute that is related to a water utility customer and/or use of a water service. External data may include, but is not limited to, climate and weather data, water quality data, or property data (e.g., square footage, zoning, building age, number of bedrooms, number of bathrooms, or assessed property value). Though the embodiments of FIG. 1 show two external data repositories 108 and 110, the present arrangements contemplate use of any number of external data repositories necessary to store external data and to provide external data stream as inputs to the present systems for detecting and reporting utility anomalies.

Each of water utility meter data repository 104, water utility billing data repository 106, first external data repository 108, and second external data repository 110, is communicatively coupled with data receptor 112, such that each data repository conveys associated data streams (e.g., water utility meter data stream, water utility billing data stream, a first external data stream, and a second external data stream, respectively) as inputs to data receptor 112, for downstream use in the present systems for detecting and reporting utility anomalies.

Data receptor 112 is communicatively coupled to data storage device A 132, such that data streams received and/or accessed by data receptor 112, from water utility meter data repository 104, water utility billing data repository 106, first external data repository 108, and second external data repository 110, are housed in data storage device A 132. According to one embodiment of the present arrangements, data receptor 112 is a computer or computer component that copies water utility data and/or external data from one computer system (e.g., a computer system associated with water utility meter data repository 104, water utility billing data repository 106, first external data repository 108, and second external data repository 110) to a data storage device (e.g., data storage device A 132 of FIG. 1).

Data storage device A 132 is a component that stores one or more data streams (e.g., water utility data streams and/or external data streams) received from or accessed by data receptor 112. According to one embodiment of the present arrangements, data storage device A 132 includes at least one member selected from a group comprising computer disk drive, RAM, magnetic tape, magnetic drive, magnetic disk, flash memory, cloud storage, optical disk, and cache memory. As shown in FIG. 1, data storage device A 132 is communicatively coupled to data transformer 114.

Data transformer 114 is a computer or computer component that is capable of transforming, or modifying, water utility data and/or external data received from data storage device A. Data transformer 114 thus may include a processor capable of carrying out conversion of unmodified data to modified data that is used by downstream anomaly-detecting-modules (explained below) to detect the existence of utility anomalies. Modified or transformed data may be thought of as data that is in an "acceptable form" that facilitates detection of one or more utility anomalies by downstream components of system 100.

Data transformer 114 is communicatively coupled to data storage device B 134, such that data transformer 114 delivers modified or transformed data to data storage device B 134 for storage. Data storage device B 134 is communicatively coupled to anomaly-detecting modules 116, such that modified or transformed data is conveyed to one or more of anomaly-detecting modules 116 for processing (i.e., for detection of one more anomalies).

According to preferred embodiments of the present arrangements, each of anomaly-detecting modules 116 is a module configured to search modified water utility data and/or modified external data in data storage device B 134 for the existence of and/or nature of one or more utility anomalies. In certain embodiments of the present arrangements, any of anomaly-detecting modules 116 is configured to perform calculations, using modified utility data and/or modified external data, and one or more predetermined threshold values, to detect the existence of and/or nature of one or more utility anomalies. For example, meter undersizing detector module 118 detects whether water utility meter 102 has a size that is smaller than a predetermined size for the utility meter. As another example, meter over-sizing detector module 120 detects whether utility meter 102 has a size that is larger than a predetermined size for the water meter. As yet another example, meter misclassification detector module 122 detects whether utility meter 102 is misclassified (e.g., misclassified as being used in a commercial setting, when it is in fact being used in a residential setting, or vice versa). As yet another example, meter tampering detector module 124 detects whether water utility meter 102 has been tampered with or adjusted in a way that requires correction. Finally, as yet another example, meter under-registration detector 126 is a module that detects whether water utility meter 102 is under-registering an amount of use of water at a location associated with water utility meter 102. The present teachings recognize that any one or more of anomaly-detecting modules 118, 120, 122, or 124, 126, may be used by the systems of the present arrangements to detect one or more utility anomalies. Further, in other embodiments of the present arrangements, one or more other types of anomaly-detecting modules are used to detect the existence of any type of utility anomaly or other types of anomalies, which may be associated with a utility meter.

Each of anomaly-detecting modules 116 is communicatively coupled to data storage device C 136 such that data storage device C 136 receives as an input, and stores, a list of utility anomalies detected by one or more modules inside anomaly-detecting modules 116.

Data storage device C is communicatively coupled to data reporter 128. Data reporter 128 is a computer or computer component that allows a user to view information about the detected utility anomalies. In certain embodiments of the present arrangements, data reporter 128 sends information about one or more utility anomalies to a client device having a user interface. As explained in further detail below with reference to FIGS. 10-12B, a client device may be used to access and present certain additional information, related to one or more utility anomalies, that guide or prompt further action on the part of a user and/or a water utility company, including remediation of the water utility meter that produces one or more of the undesired utility anomalies.

While the embodiment of FIG. 1 shows three data storage devices (i.e., data storage device A 132, data storage device B 134, and data storage device C 136, systems of the present arrangement may include any number of data storage devices. According to one embodiment of the present arrangements, data storage device A 132, data storage device B 134, and data storage device C 136, are the same. According to another embodiment of the present arrangements, data storage device A 132 and data storage device 134 B are the same. According to yet another embodiment of the present arrangements, data storage device A 132 and data storage device C 136 are the same. According to yet another embodiment of the present arrangement, data storage device B 134 and data storage device 136 C are the same. Any number of data storage devices, including one data storage device, may be employed by systems of the present arrangements.

System 100 of FIG. 1 may be configured to receive new inputs (e.g., data streams) that are repeatedly fed into the system, either on a regular, recurring basis, or on an occasional, as-needed basis, to produce new outputs related to whether and to what extent water utility meters are producing utility anomalies. In such manner, system 100 may be used to monitor, over time, water utility meters.

Further, as explained in more detail below with reference to FIGS. 10, 11, 12A, and 12B, systems and methods of the present arrangements and teachings may be used to provide information that prompts a water utility company to remediate water meters producing utility anomalies (e.g., by reclassifying, adjusting, repairing, or replacing a water utility meter at a particular location). Prior to that discussion, different exemplar configurations of the different components participating in the detection of utility anomalies is presented below.

Figure 2A:
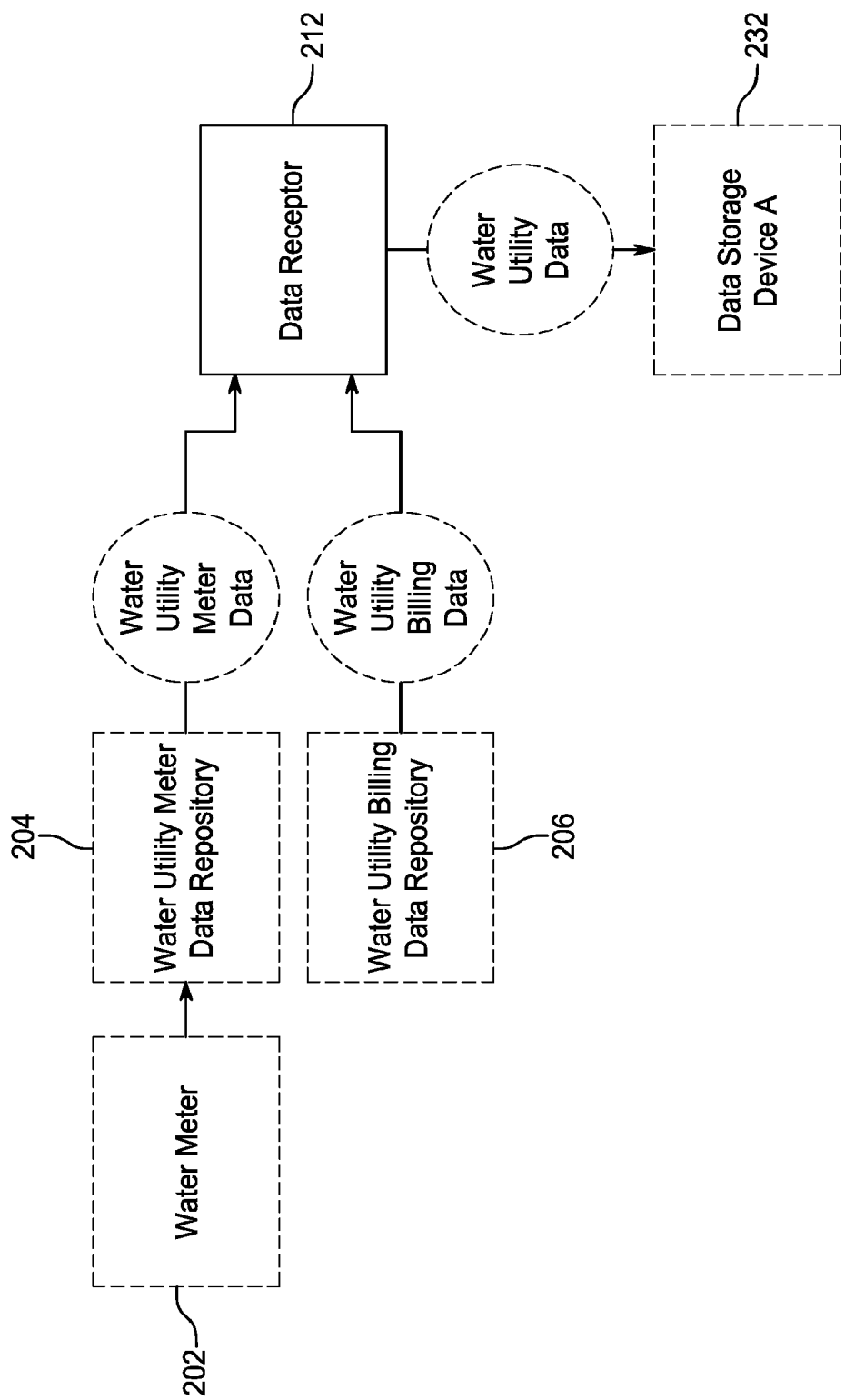
FIG. 2A is a block diagram showing a data receptor, according to one embodiment of the present arrangements, and depicting its relationships to certain inputs, outputs, and non-system devices associated with the present systems for detecting utility anomalies (e.g., system 100 of FIG. 1).

FIG. 2A is a block diagram showing a data receptor 212, according to one embodiment of the present arrangements, and depicting its relationships with certain inputs, outputs, and non-system devices associated with data receptor 212. As with certain other structures and sub-systems described herein (e.g., with reference to FIGS. 2B-9B), data receptor 212 and its related non-system components in the embodiment of FIG. 2A may be thought of as a part of a larger system for detecting and reporting utility anomalies (e.g., system 100 of FIG. 1). Accordingly, a water meter 202, a water utility meter data repository 204, a water utility billing data repository 206, a data receptor 212, and a data storage device A 232, are substantially similar to their counterparts in FIG. 1 (i.e., water mater meter 102, water utility meter data repository 104, water utility billing data repository 106, data receptor 112, and data storage device A 132).

As shown in FIG. 2A, water meter 202 is communicatively coupled to water utility meter data repository 204, which has stored therein water utility data obtained from water meter 202. Each of water utility meter data depository 204 and water utility billing data repository 206 (which contains water utility billing data stored in memory) is communicatively coupled to data receptor 212 such that water utility meter data and water utility billing data are received and organized at data receptor 212 and, then during a subsequent instance in time, may be conveyed to downstream components. Water utility meter data repository 204 and/or water utility billing data repository 206 may be operated by a utility company and/or by a third party.

Once water utility billing data is received by data receptor 212, water utility data (which may be thought of as the combination of water utility meter data and water utility billing data) is conveyed to data storage device A, where it is stored and made accessible to downstream components of the present systems for detecting and reporting utility anomalies.

Figure 2B:
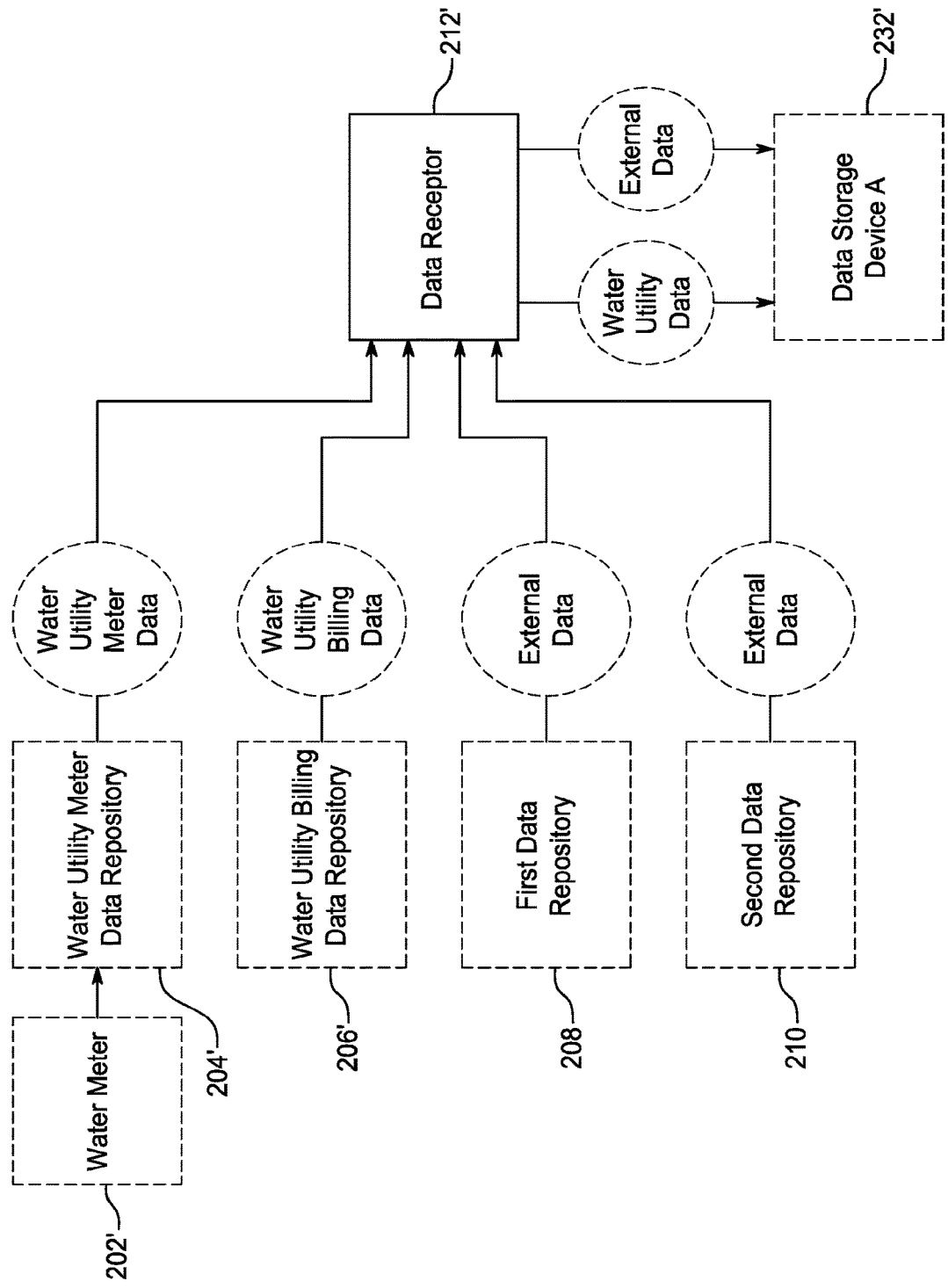
FIG. 2B is a block diagram showing a data receptor, according to an alternate embodiment of the present arrangements, and depicting its relationships to certain inputs, outputs, and non-system devices associated with the present systems for detecting utility anomalies (e.g., system 100 of FIG. 1).

FIG. 2B is a block diagram showing a data receptor 212', according to an alternate embodiment of the present arrangements, and depicting its relationships with certain inputs, outputs, and non-system devices associated with data receptor 212'. A water meter 202', a water utility meter data repository 204', a water utility billing data repository 206', a first external data repository 108, a second external data repository 210, a data receptor 212', and a data storage device A 232', are substantially similar to their counterparts in FIG. 1 (i.e., water meter 102, water utility meter data repository 104, water utility billing data repository 106, first external data repository 108, second external data repository 110, data receptor 112, and data storage device A 132).

Figure 3A:
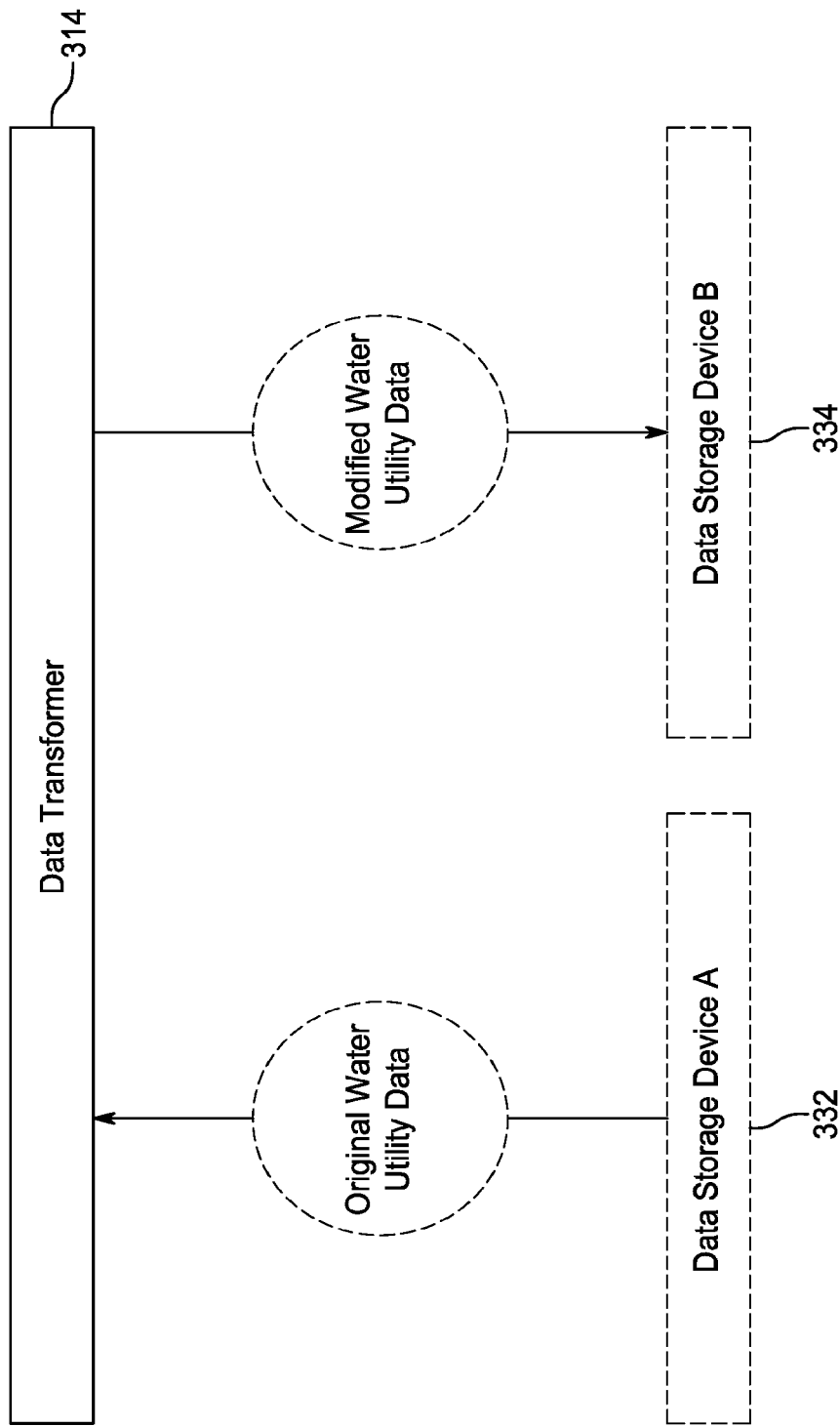
FIG. 3A is a block diagram showing a data transformer, according to one embodiment of the present arrangements, and depicting its relationships to certain inputs, outputs, and non-system devices associated with the present systems for detecting utility anomalies (e.g., system 100 of FIG. 1).

As shown in FIG. 2B, each of water utility meter data repository 204', water utility billing data repository 206', first external data repository 208, and/or second external data repository 210, is communicatively coupled to data receptor 212', such that data receptor 212' receives data streams associated with each data repository (i.e., water utility meter data, water utility billing data, and external data). According to one embodiment of the present arrangements, data receptor 212' queries any of data repositories 204', 206', 208, and/or 210, for new water utility billing data, water utility meter data, and/or one or more types of external data, which if present, is delivered to data receptor 212'. According to another embodiment of the present arrangements, any of data repositories 204', 206', 208, and/or 212' is configured to notify data receptor 212' when new water utility data and/or external data is available, and is further configured to deliver any such data to data receptor 212'. Then, data receptor 212' delivers water utility data and/or external data to data storage device A 232' for storage FIG. 3A is a block diagram showing a data transformer 314, according to one embodiment of the present arrangements, and depicting its relationships to certain inputs, outputs, and non-system devices associated with data transformer 304. FIG. 3A includes data transformer 314, a first data storage device 332, and a second data storage device 334, which are substantially similar to their counterparts in FIG. 1 (i.e., data transformer 114, data storage device A 132, and data storage device B 134).

As shown in FIG. 3A, data storage device A 332 is communicatively coupled to data transformer 314. In such manner, water utility data stored on data storage device A 332 is delivered as an input into data transformer 314. Prior to delivery to data transformer 314, such water utility data may be considered "original" water utility data.

Data transformer 314, then, is configured to carry out modification, or transformation, of original water utility data, producing "modified", or "transformed", water utility data. In other words, data transformer 314 modifies, or transforms, original data into a modified format that promotes downstream detection of utility anomalies by certain components of the systems of the present arrangements (e.g., system 100 of FIG. 1).

According to one embodiment of the present arrangements, data transformer 314 examines and modifies original water utility data. For example, it may be useful for data transformer 314 to convert timestamps in water utility data from one time zone to another. As another example, it may be useful for data transformer 314 to convert a measurement of water volume consumption at a water meter from one unit of measure to another. As yet another example, it may be useful for data transformer 314 to remove data that is intended by the system to be excluded. The systems of the present arrangements contemplate any transformation or modification of water utility data that facilitates downstream detection of one or more anomalies.

According to another embodiment of the present arrangements, data transformer 314 does not modify original water utility data, but instead carries out other actions related to original water utility data received from data storage device A 332. For example, data transformer 314 may confirm that original water utility data is in an acceptable form, even if no modification of that data is required. In yet another embodiment of the present arrangements, original water utility data is processed by downstream components in system 100 of FIG. 1 in the form it is received, in which case data transformer 314 is not used. For example, it may be desirable not to use data transformer 314 if original water utility data is known to be in an acceptable form. The systems of the present arrangements contemplate any modification of water utility data (including no modification of water utility data) that promotes detecting utility anomalies by systems of the present arrangements.

Figure 3B:
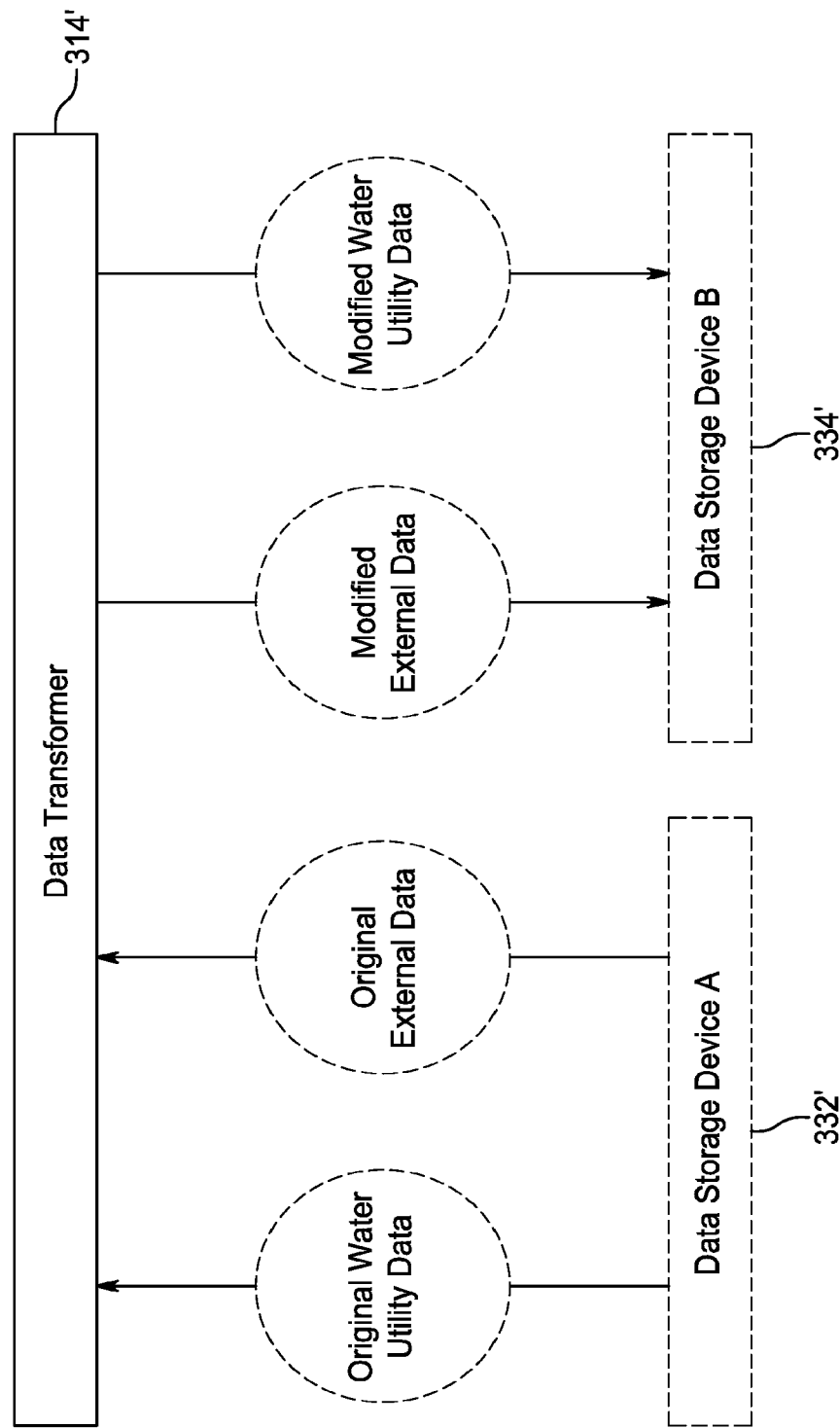
FIG. 3B is a block diagram showing a data transformer, according to an alternate embodiment of the present arrangements, and depicting its relationships to certain inputs, outputs, and non-system devices associated with the present systems for detecting utility anomalies (e.g., system 100 of FIG. 1).

FIG. 3B is a block diagram showing a data transformer 314', according to an alternate embodiment of the present arrangements, and depicting its relationships with certain inputs, outputs, and devices associated with data receptor 212'. Data transformer 314', a data storage device A 332', and a data storage device B 334', are substantially similar to their counterparts in FIG. 3A (i.e., data transformer 314, data storage device A 332, and data storage device B 334).

Unlike the embodiment of FIG. 3A, data transformer 314' in system 300' is also configured to modify and/or transform one more types of original external data. For example, it may be desirable to convert timestamps in original external data from one time zone to another. As another example, it may be useful to confer a location address associated with original external data into a standard format. As yet another example, it may be useful to remove certain types of external data, as such external data may not be necessary for ultimately detecting a utility anomaly.

According to another embodiment of the present arrangements, data transformer 314' examines, but does not modify, any portion of original external data. For example, it may be desirable to confirm that original external data is in an acceptable format, even if no modification of the data is required. According to yet another embodiment of the present arrangements, external data is processed in the form it is received by data transformer 314', such that data transformer 314' is not used. For example, it may be desirable not to use data transformer 314' if original external data is known already to be in an acceptable format.

According to the embodiments of FIGS. 3A and 3B, data transformer 314 and data transformer 314', respectively, are configured to deliver original and/or modified external data and/or water utility data to data storage device B 334 and data storage device B 334', respectively. In certain embodiments of the present arrangements, data storage device A 332 and/or data storage device A 332' are the same as data storage device B 334 and/or data storage device 334', respectively. In other words, both of the embodiments of FIGS. 3A and 3B contemplate use of a data transformer that receives original data from, and delivers modified data to, the same data storage device.

Figure 4A:
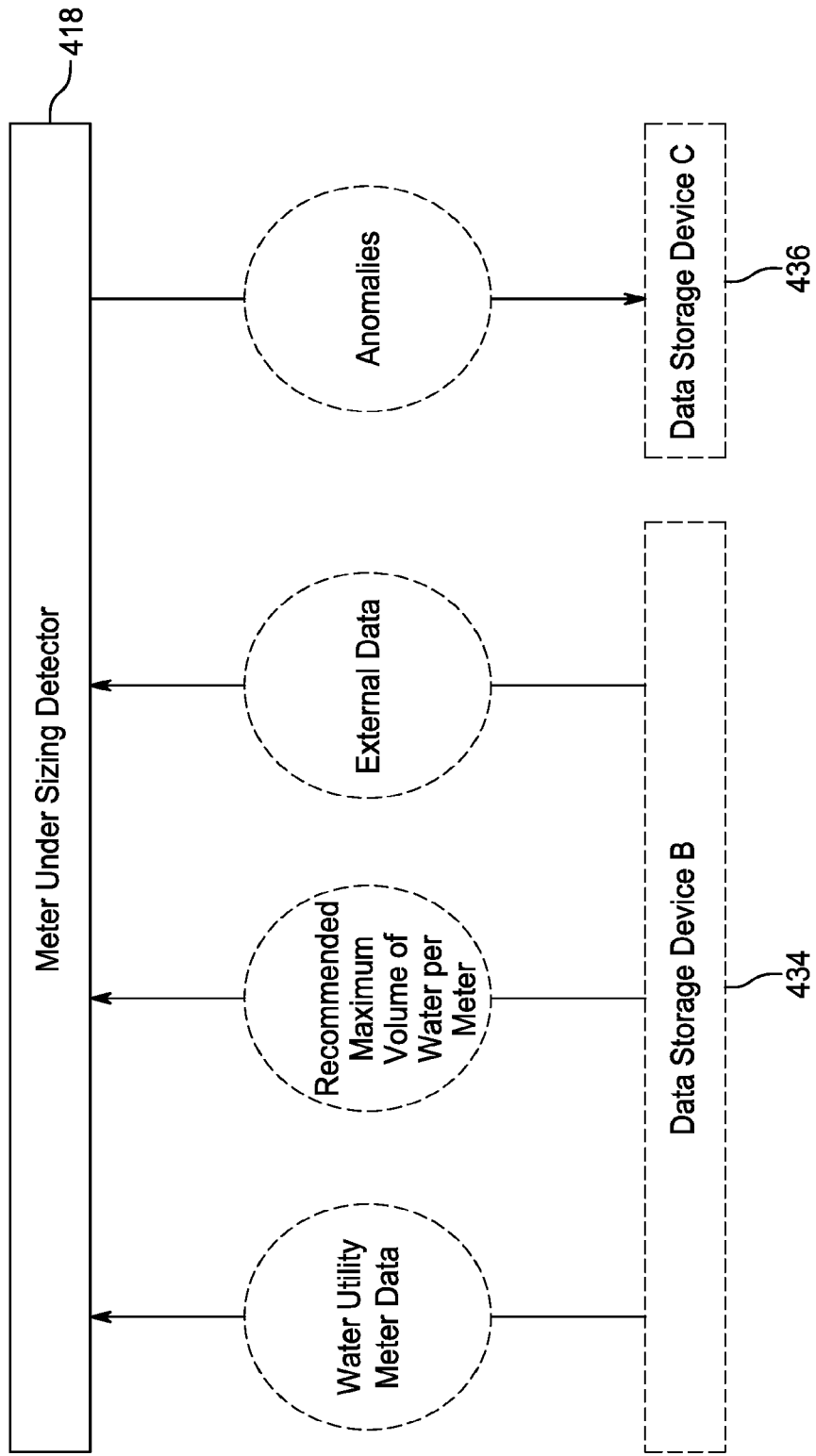
FIG. 4A is a block diagram showing a meter under-sizing detector module, according to one embodiment of the present arrangements, and depicting its relationships to certain inputs, outputs, and non-system devices associated with the present systems for detecting utility anomalies (e.g., system 100 of FIG. 1).

FIG. 4A is a block diagram showing a meter under-sizing detector 418, according to one embodiment of the present arrangements, and depicting its relationships with certain related inputs, outputs, and non-system devices. Meter under-sizing detector 418, a data storage device B 434, and a data storage device C 436 are substantially similar to their counterparts in FIG. 1 (i.e., meter under-sizing detector 118, data storage device B 134, and data storage device C 136).

As shown in FIG. 4A, meter under-sizing detector 418 is communicatively coupled to data storage device B 434 and data storage device C 436. Meter under-sizing detector 418 searches water utility meter data and/or external data located on data storage device B 434 for water meters matching a set of predefined criteria, preferably configured on data storage device B 434, that indicate that a meter may be smaller than a preferred size for the location where it has been installed. As shown in FIG. 4A, the predetermined criteria includes "a recommended maximum volume of water per meter" (i.e., a recommended maximum volume of water per unit of time that a water meter (e.g. water meter 102 of FIG. 1) may accurately measure based on its size). Meter under-sizing detector 418 then records utility anomalies, preferably to data storage device C 436.

Water utility meter data may be presented as time series data measurements representing a sequence of values occurring at specified points in time. When meter time series measurements matching one or more predefined thresholds are located, meter under-sizing detector 418 records an anomaly on data storage device C 436 (to which meter under-sizing detector 418 is communicatively coupled).

According to one embodiment of the present arrangements, meter under-sizing detector 418 records an anomaly for each set of meter time series data measurements having at least one data point greater than the recommended maximum volume of water associated with a water meter. For example, if the recommended maximum volume of water per meter is 40 gallons per minute, and the data points in the time series measurements are equivalent to 10, 15, 10, 20, and 10 gallons per minute, then none of the data points is above the recommended maximum volume of water per meter, so no utility anomaly is recorded. As another example, if the recommended maximum volume of water per meter is 40 gallons per minute, and the data points in the time series measurements are equivalent to 10, 15, 50, 20, and 10 gallons per minute, then one of the data points is above the recommended maximum volume of water per meter, and consequently, one utility anomaly is recorded.

Figure 4B:
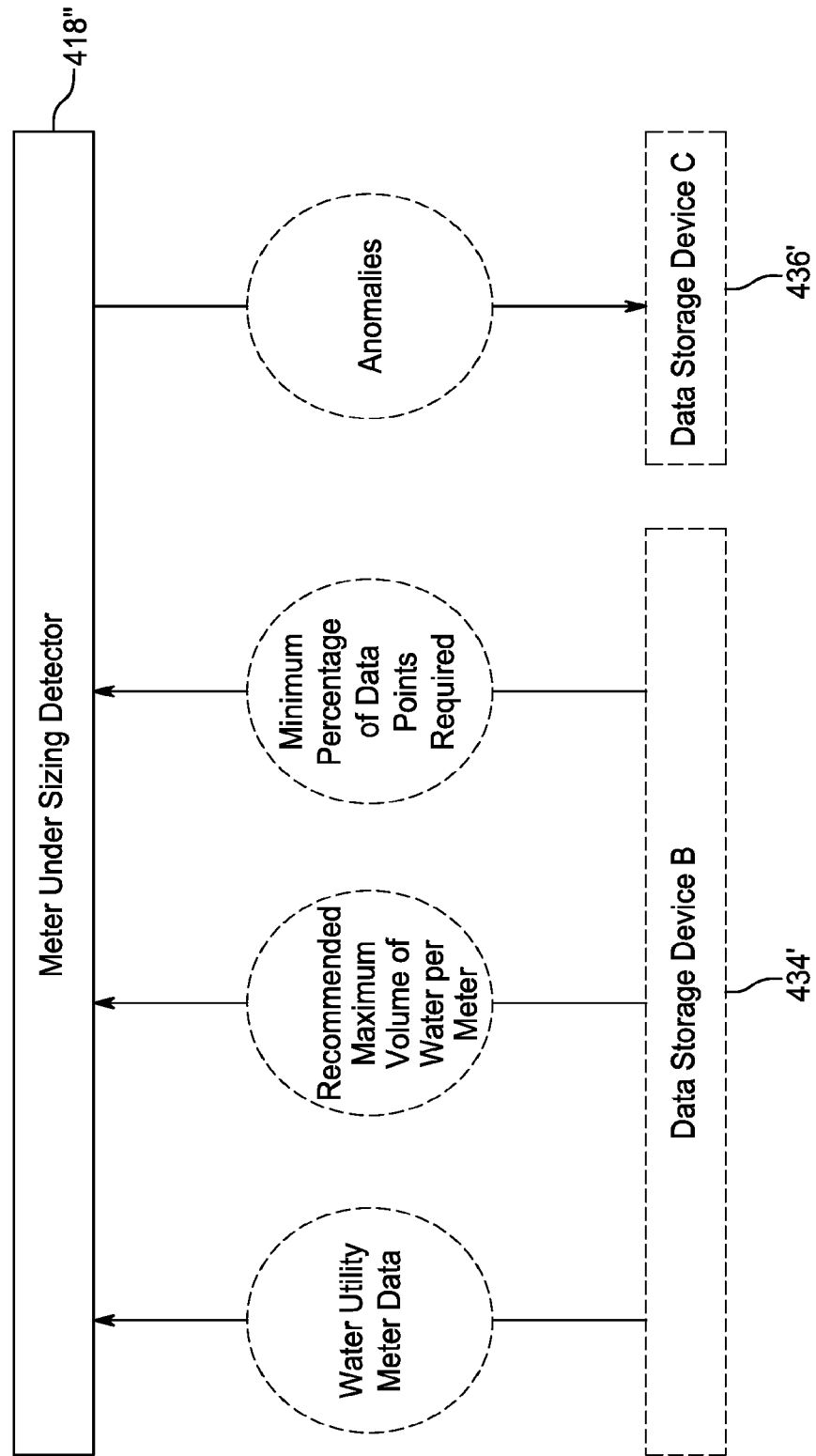
FIG. 4B is a block diagram showing a meter under-sizing detector module, according to an alternate embodiment of the present arrangements, and depicting its relationships to certain inputs, outputs, and non-system devices associated with the present systems for detecting utility anomalies (e.g., system 100 of FIG. 1).

FIG. 4B is a block diagram showing a meter under-sizing detector 418', according to an alternate embodiment of the present arrangements, and which depicts its relationships to certain related inputs, outputs, and non-system devices. Meter under-sizing detector 418', a data storage device B 434', and a data storage device C 436', are substantially similar to their counterparts in FIG. 4A (i.e., meter under-sizing detector 418, data storage device A 434, and data storage device B 436).

As shown in FIG. 4B, meter under-sizing detector 418' is communicatively coupled to data storage device B 434' and data storage device C 436'. Meter under-sizing detector 418' searches water utility meter data on data storage device B 434' for water meters matching a set of predefined criteria, preferably configured on data storage device B 434, that indicate that a meter may be smaller than a preferred size for the location where it has been installed. As shown in FIG. 4B, the predetermined criteria includes "a recommended maximum value of water per meter" (as described above with reference to FIG. 4A), as well as a "minimum percentage of data points required" (i.e., a minimum percentage of data points greater than the recommended maximum volume of water per meter). To the extent that the embodiment of FIG. 4B must satisfy more criteria than the embodiment of FIG. 4A, meter under-sizing detector 418' of FIG. 4B may be thought of as producing more accurate detection of meter under-sizing than meter under-sizing detector 418 of FIG. 4A. In other words, the more (meaningful) constraints that are applied on the utility data, which are ultimately subject to analysis by the anomaly-detecting modules 116 of FIG. 1, preferably, the more accurate the utility anomaly information is.

According to the embodiment of FIG. 4B, meter under-sizing detector 418' records an anomaly for each meter set of time series measurements having at least the specified minimum percentage of data points greater than the maximum volume. In one example, if the recommended maximum volume of water per meter is 40 gallons per minute, and the data points in the time series measurements are equivalent to 10, 15, 10, 20, and 10 gallons per minute, and the minimum percentage of data points required is 25%, then none of the data points is above the recommended maximum volume, so no anomaly is recorded. As another example, if the recommended maximum volume of water per meter is 40 gallons per minute, and the data points in the time series measurements are equivalent to 10, 15, 50, 20, and 10 gallons per minute, and the minimum percentage of data points required is 25%, then 20% of the data points are above the recommended maximum volume, so no anomaly is recorded. As yet another example, if the recommended maximum volume of water per meter is 40 gallons per minute, and the data points in the time series measurements are equivalent to 10, 15, 50, 45, and 10 gallons per minute, and the minimum percentage of data points required is 25%, then 40% of the data points are above the adjusted recommended maximum volume, so one anomaly is recorded.

Figure 4C:
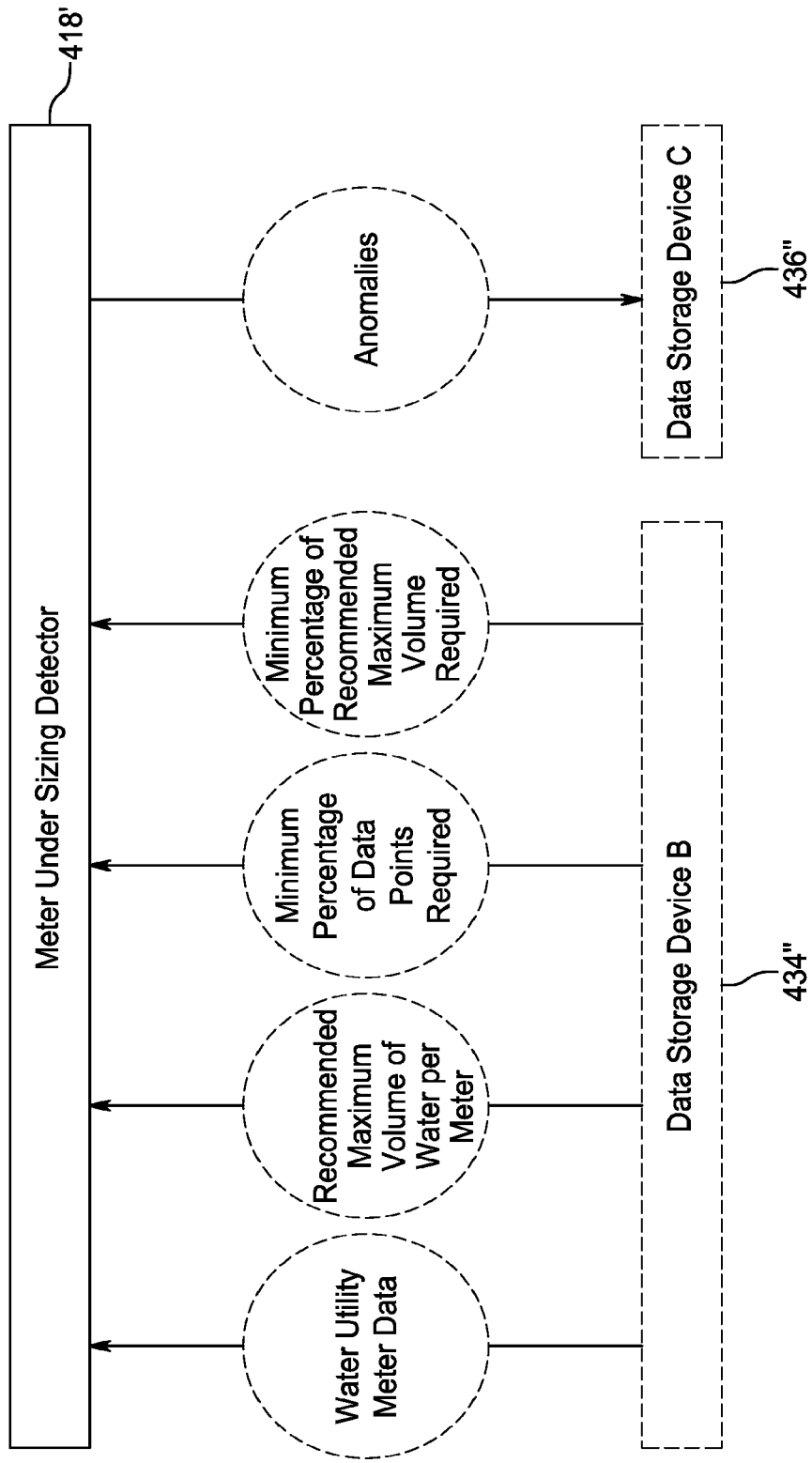
FIG. 4C is a block diagram showing a meter under-sizing detector module, according to another alternate embodiment of the present arrangements, and depicting its relationships to certain inputs, outputs, and non-system devices associated with the present systems for detecting utility anomalies (e.g., system 100 of FIG. 1).

FIG. 4C is a block diagram showing a meter under-sizing detector 418", according to another alternate embodiment of the present arrangements, and depicting its relationships with certain related inputs, outputs, and non-system devices. Meter under-sizing detector 418", a data storage device B 434", and a data storage device C 436", are substantially similar to their counterparts in FIG. 4B (i.e., meter under-sizing detector 418', data storage device B 434', and data storage device C 436').

As shown in FIG. 4C, meter under-sizing detector 418" is communicatively coupled to data storage device B 434" and data storage device C 436". According to one embodiment of the present arrangements, meter under-sizing detector 418" searches water utility meter data and/or external data located on data storage device B 434" for water meters matching a set of predefined criteria, preferably configured on data storage device B 434", that indicate that a meter may be smaller than a preferred size for the location where it has been installed. As shown in FIG. 4C, multiple predetermined criteria may include a "recommended maximum volume of water per meter" (as described above with reference to FIGS. 4A and 4B), a "minimum percentage of data points required" (i.e., minimum percentage of data points greater than the recommended maximum volume), as well as a "minimum percentage of recommended maximum volume required" (i.e., the recommended maximum volume of water that a water meter can accurately measure).

According to the embodiment of FIG. 4C, meter under-sizing detector 418" records an anomaly for each set of meter time series measurement having at least the specified minimum percentage of data points required. For example, if the recommended maximum volume of water per meter is 40 gallons per minute, and the data points in the time series measurements are equivalent to 10, 15, 10, 20, and 10 gallons per minute, and the minimum percentage of data points required is 25%, and the minimum percentage of recommended maximum volume required is 80%, then none of the data points is above the recommended maximum volume, so no anomaly is recorded. As another example, if the recommended maximum volume of water per meter is 40 gallons per minute, and the data points in the time series measurements are equivalent to 10, 15, 50, 20, and 10 gallons per minute, and the minimum percentage of data points required is 25%, and the minimum percentage of recommended maximum volume required is 80%, then 20% of the data points are above the adjusted recommended maximum volume, so no anomaly is recorded. As yet another example, if the recommended maximum volume of water per meter is 40 gallons per minute, and the data points in the time series measurements are equivalent to 10, 15, 38, 37, and 10 gallons per minute, and the minimum percentage of data points required is 25%, and minimum percentage of recommended maximum volume required is 80%, then 40% of the data points are above the adjusted recommended maximum volume, so one anomaly is recorded.

As shown in FIG. 4C, meter under-sizing detector 418" is communicatively coupled to data storage device C 43'6' such that utility anomalies detected by meter under-sizing detector 418" are delivered to data storage device C 436" for storage, where this information may be accessed by downstream components.

Figure 5A:
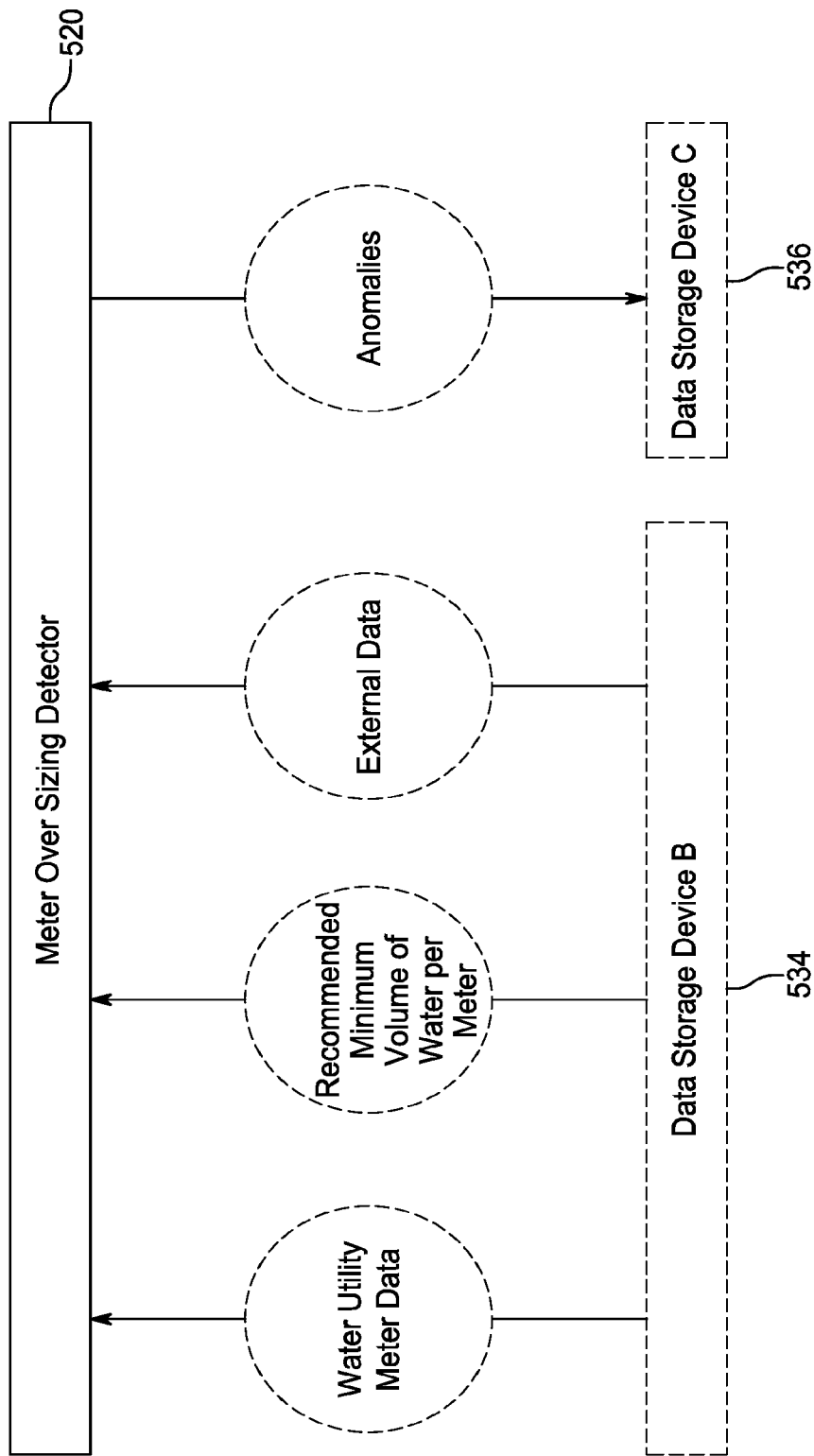
FIG. 5A is a block diagram showing a meter over-sizing detector module, according to one embodiment of the present arrangements, and depicting its relationships to certain inputs, outputs, and non-system devices associated with the present systems for detecting utility anomalies (e.g., system 100 of FIG. 1).

FIG. 5A is a block diagram showing a meter over-sizing detector 520, according to one embodiment of the present arrangements, and that depicts its relationship to certain related inputs, outputs, and non-system devices. Meter over-sizing detector 520, a data storage device B 534, and a data storage device C 536 are substantially similar to their counterparts in FIG. 1 (i.e., meter over-sizing detector 120, data storage device B 134, and data storage device C 136).

As shown in FIG. 5A, meter over-sizing detector 520 is communicatively coupled to data storage device B 534 and data storage device B 536. Meter over-sizing detector 520 searches water utility meter data and/or external data, located on data storage device B 534, for water meters matching a set of predefined criteria that indicate that a meter may be larger than the preferred size for the location where it has been installed. Such predetermined criteria may include a "recommended minimum volume of water per meter" (i.e., the recommended minimum value of water that each water meter can accurately measure based on the size of the meter). Water utility meter data and/or external data may be time series data measurements representing a sequence of values occurring at specified points in time. When a set of meter time series measurements matching the criteria is located, meter over-sizing detector 520 records an anomaly on data storage device C 536.

According to one embodiment of the present arrangements, meter over-sizing detector 520 records an anomaly for each meter set of time series measurements having at least one data point smaller than the recommended minimum volume. For example, if the recommended minimum volume of water per meter is 8 gallons per minute, and the data points in the time series measurements are equivalent to 10, 15, 10, 20, and 10 gallons per minute, then none of the data points is below the recommended minimum volume, so no anomaly is recorded. As another example, if the recommended minimum volume of water per meter is 8 gallons per minute, and the data points in the time series measurements are equivalent to 10, 15, 5, 20, and 10 gallons per minute, then one data point is below the recommended minimum volume, so one anomaly is recorded.

Figure 5B:
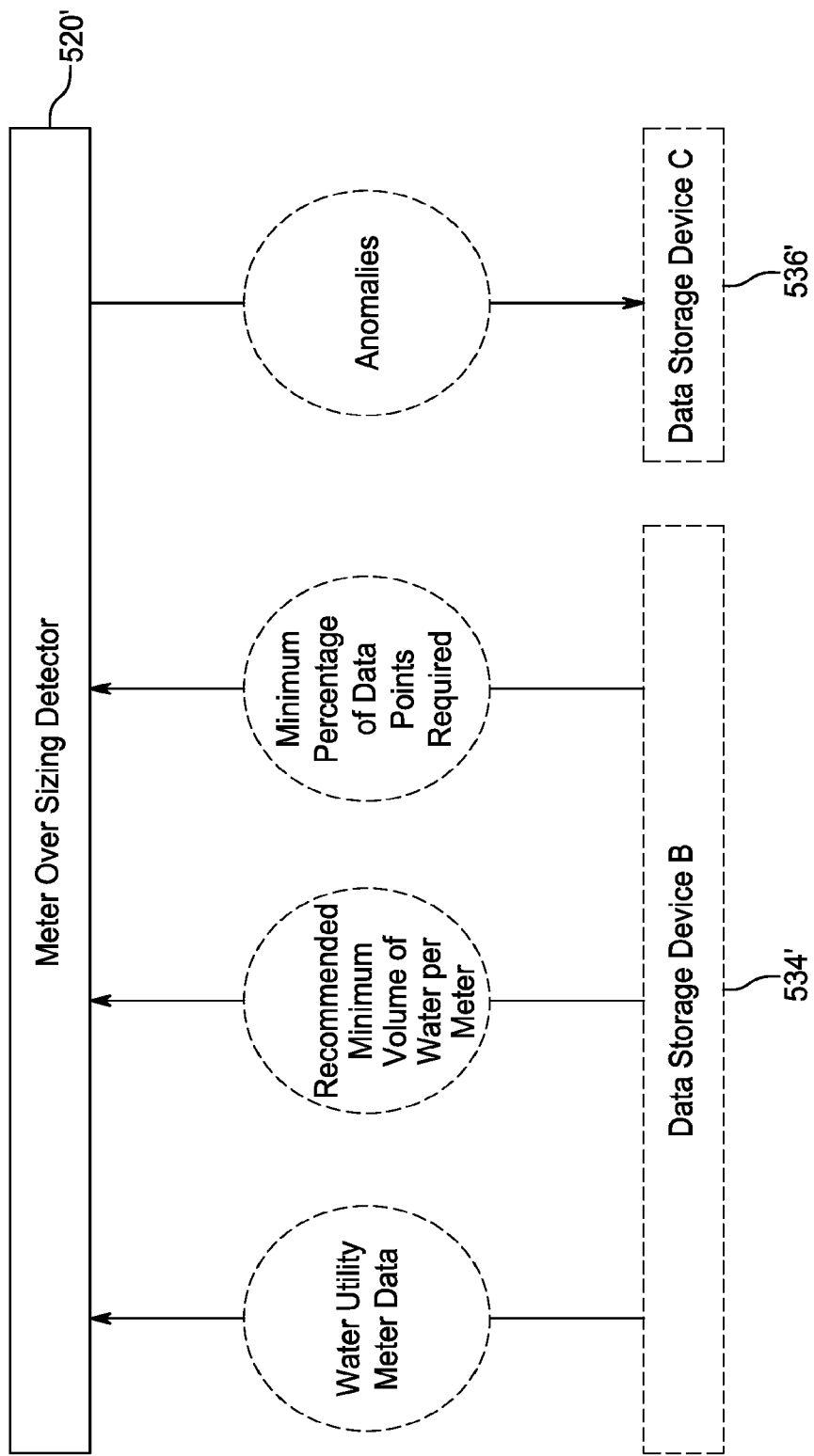
FIG. 5B is a block diagram showing a meter over-sizing detector module, according to an alternate embodiment of the present arrangements, and depicting its relationships to certain inputs, outputs, and non-system devices associated with the present systems for detecting utility anomalies (e.g., system 100 of FIG. 1).

FIG. 5B is a block diagram showing a meter over-sizing detector 520', according to an alternate embodiment of the present arrangements, and that depicts its relationship to certain related inputs, outputs, and non-system devices. Meter over-sizing detector 520', a data storage device B 534', and a data storage device C 536', are substantially similar to their counterparts in FIG. 5A (i.e., meter over-sizing detector 520, data storage device B 534, and data storage device C 536).

As shown in FIG. 5B, meter over-sizing detector 520' is communicatively coupled to data storage device B 534' and data storage device C 536'. Meter over-sizing detector 520' searches water utility meter data, located on data storage device B 534', for water meters matching a set of predefined criteria that indicate a meter may be larger than the preferred size for the location where it has been installed. As shown in FIG. 5B, such predetermined criteria includes a "recommended minimum volume of water per meter" (as described above with reference to FIG. 5A), as well as a "minimum percentage of data points required" (i.e., a specified percentage of data points that must be below the minimum volume of water per meter).

According to one embodiment of the present arrangements, meter over-sizing detector 520' records an anomaly to data storage device C 536 for each set of meter time series measurements having at least the minimum percentage of data points required. For example, if the recommended minimum volume of water per meter is 8 gallons per minute, and the data points in the time series measurements are equivalent to 10, 15, 10, 20, and 10 gallons per minute, and the minimum percentage of data points required is 25%, then none of the data points is below the recommended minimum volume, so no anomaly is recorded. As another example, if the recommended minimum volume of water per meter is 8 gallons per minute, and the data points in the time series measurements are equivalent to 10, 15, 5, 20, and 10 gallons per minute, and the minimum percentage of data points required is 25%, then 20% of the data points are below the recommended minimum volume, so no anomaly is recorded. As yet another example, if the recommended minimum volume of water per meter is 8 gallons per minute, and the data points in the time series measurements are equivalent to 10, 15, 5, 7, and 10 gallons per minute, and the minimum percentage of data points required is 25%, then 40% of the data points are below the recommended minimum volume, so one anomaly is recorded to data storage device C 436'.

Figure 5C:
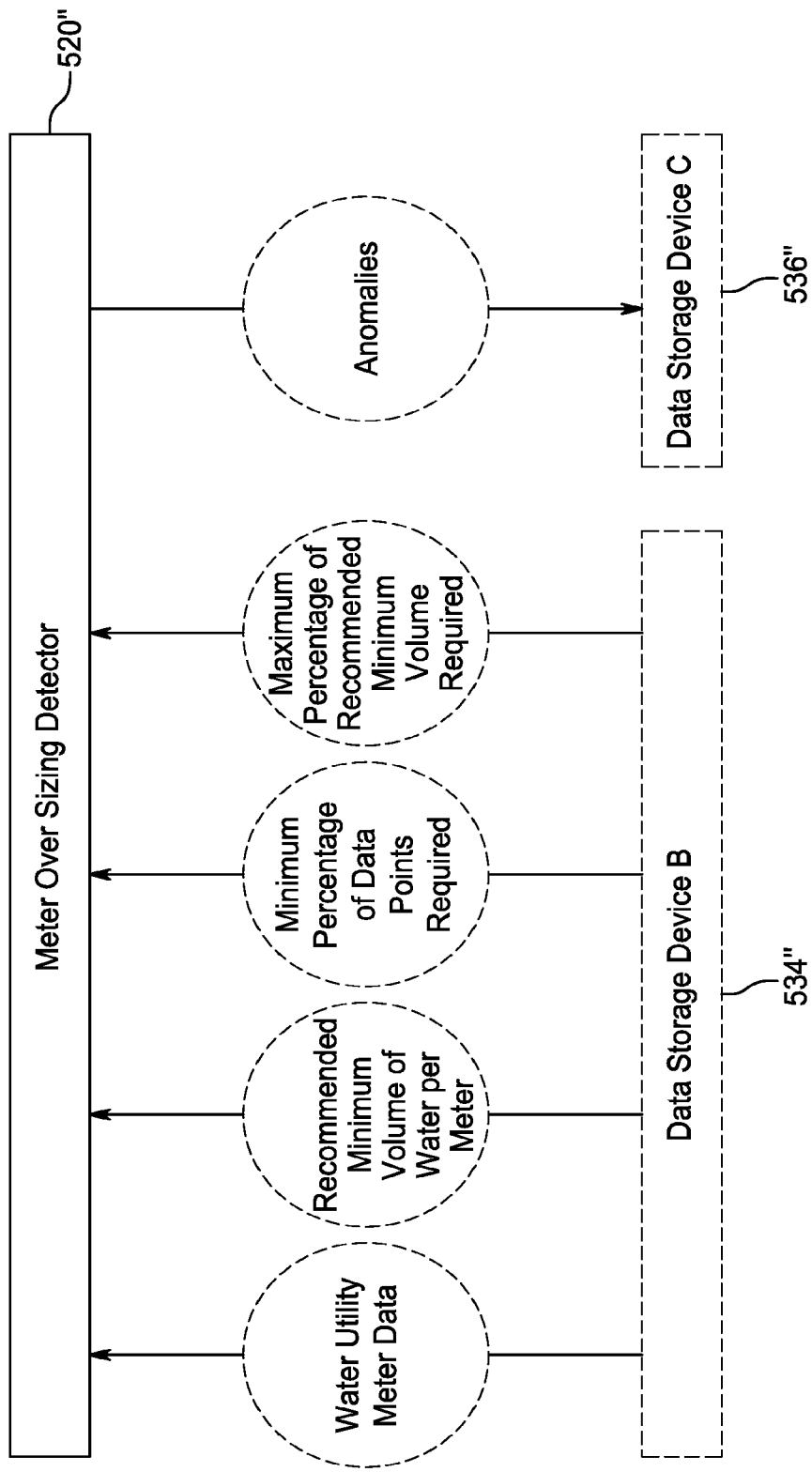
FIG. 5C is a block diagram showing a meter over-sizing detector module, according to another alternate embodiment of the present arrangements, and depicting its relationships to certain inputs, outputs, and non-system devices associated with the present systems for detecting utility anomalies (e.g., system 100 of FIG. 1).

FIG. 5C is a block diagram showing a meter over-sizing detector 520", according to another embodiment of the present arrangements, and that depicts its relationship to certain related inputs, outputs, and non-system devices. Meter over-sizing detector 520", a data storage device B 534", and a data storage device C 536", are substantially similar to their counterparts in FIG. 5B (i.e., meter over-sizing detector 520', data storage device B 534', and data storage device C 536').

As shown in FIG. 5C, meter over-sizing detector 520" is communicatively coupled to data storage device B 534" and data storage device C 536". Meter over-sizing detector 520" searches water utility meter data, located on data storage device B 534, for water meters matching a set of predefined criteria that indicate a meter may be larger than the preferred size for the location where it has been installed. Such predetermined criteria may include a "recommended minimum volume of water per meter" (as described above with reference to FIGS. 5A and/or 5B), "a maximum percentage of recommended minimum volume required" (also known as the "adjusted recommended minimum volume"), and a "minimum percentage of data points required" (i.e., the specified percentage of data points that must be below the adjusted recommended minimum volume).

According to one embodiment of the present arrangements, meter over-sizing detector 520" records an anomaly, to data storage device C 536", for each set of meter time series measurement having at least the minimum percentage of data points required. In one example, if the recommended minimum volume of water per meter is 8 gallons per minute, and the data points in the time series measurements are equivalent to 10, 15, 10, 20, and 10 gallons per minute, and the maximum percentage of recommended minimum volume required is 110%, and the minimum percentage of data points required is 25%, then none of the data points is below the adjusted recommended minimum volume, so no anomaly is recorded. As another example, if the recommended minimum volume of water per meter is 8 gallons per minute, and the data points in the time series measurements are equivalent to 10, 15, 5, 20, and 10 gallons per minute, and the maximum percentage of recommended minimum value required is 110%, and the minimum percentage of data points required is 25%, then 20% of the data points are below the adjusted recommended minimum volume per meter, so no anomaly is recorded. As yet another example, recommended minimum volume of water per meter is 8 gallons per minute, and the data points in the time series measurements are equivalent to 10, 15, 5, 7, and 10 gallons per minute, and the maximum percentage of recommended minimum value required is 110%, and the minimum percentage of data points required is 25%, then 40% of the data points are below the adjusted recommended minimum volume, so one anomaly is recorded to data storage device C 536".

Figure 6A:
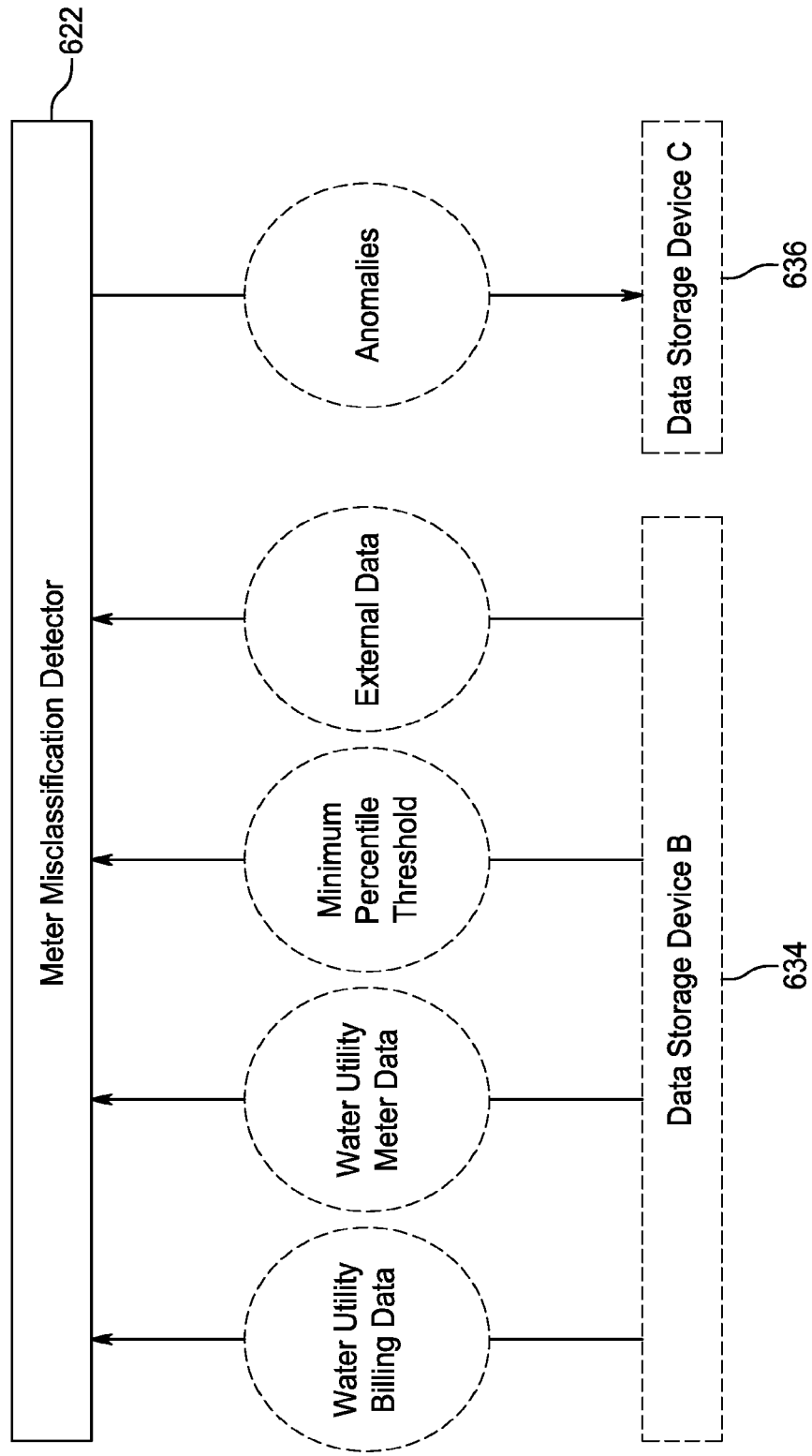
FIG. 6A is a block diagram showing a meter misclassification detector module, according to one embodiment of the present arrangements, and depicting its relationships to certain inputs, outputs, and non-system devices associated with the present systems for detecting utility anomalies (e.g., system 100 of FIG. 1).

FIG. 6A is a block diagram showing a meter misclassification detector 622, according to one embodiment of the present arrangements, and that depicts its relationships with certain related inputs, outputs, and non-system devices. Meter misclassification detector 622, a data storage device B 634, and a data storage device C 636, are substantially similar to their counterparts in FIG. 1 (i.e., meter misclassification detector 122, data storage device B 134, and data storage device C 136).

As shown in FIG. 6A, meter misclassification detector 622 is communicatively coupled to data storage device B 634 and data storage device C 636. Meter misclassification detector 622 searches water utility meter and/or water utility billing data, and in certain embodiments of the present arrangements, external data, that is located on data storage device B 634, for water meters matching a set of predefined criteria that indicate that a meter may have been misclassified. Such predefined criteria include a "minimum percentile threshold" (i.e., a percentile threshold above which a water utility meter is deemed to have been misclassified). One example of a water meter that has been misclassified is a commercial water meter that has been incorrectly classified as a residential water meter.

According to one embodiment of the present arrangements, water utility meter data and water utility billing data are presented as time series data measurements representing a sequence of values occurring at specified points in time. When a set of meter time series measurements matching the criteria is located, meter misclassification detector 622 records an anomaly on data storage device C 636.

According to another embodiment of the present arrangements, meter misclassification detector 622 records an anomaly to data storage device C 636 for each meter with a set of time series data point measurements above the configured percentile threshold if the meter class in the billing data does not match the detected meter class from the time series data measurements. For example, if meter misclassification detector is configured with a maximum percentile of 99%, then a meter will be considered to have a detected class of commercial, and an anomaly will be recorded for each of the top 1% of data points, sorted by volume from highest to lowest values of volumes of water, having a detected class not matching commercial.

Figure 6B:
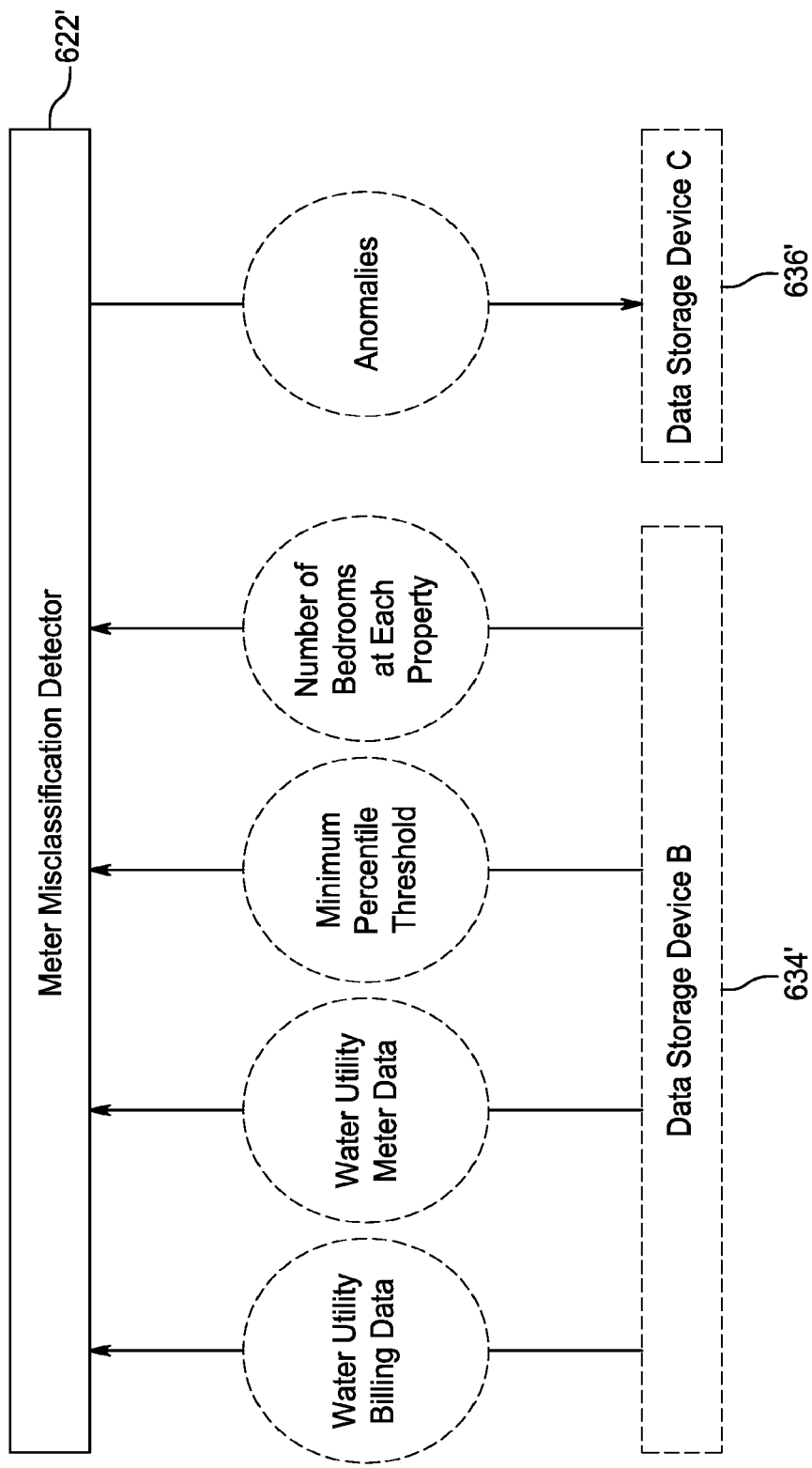
FIG. 6B is a block diagram showing a meter misclassification detector module, according to an alternate embodiment of the present arrangements, and depicting its relationships to certain inputs, outputs, and non-system devices associated with the present systems for detecting utility anomalies (e.g., system 100 of FIG. 1).

FIG. 6B is a block diagram showing a meter misclassification detector 622', according to an alternate embodiment of the present arrangements, and that depicts its relationships with certain related inputs, outputs, and non-system devices. Meter misclassification detector 622', a data storage device B 634', and a data storage device C 636', are substantially similar to their counterparts in FIG. 6A (i.e., meter misclassification detector 622, data storage device B 634, and data storage device C 636).

As shown in FIG. 6B, meter misclassification detector 622' is communicatively coupled to data storage device B 634' and data storage device C 636'. Meter misclassification detector 622' searches water utility meter data and/or water utility billing data, located on data storage device B 634, for water meters matching a set of predefined criteria that indicate that a meter may have been misclassified. Such predefined criteria in FIG. 6B includes a "minimum percentile threshold" (as described above with reference to FIG. 6A) and a "number of bedrooms at each property".

According to one embodiment of the present arrangements, meter misclassification detector 622' records an anomaly for each meter with a set of time series data point measurements above the minimum percentage threshold if the meter class in the water utility billing data does not match the detected meter class from the time series data measurements, if the property where the associated water meter is installed is known to have a specified number of bedrooms, and the water usage exceeds the amount of expected water usage for a property with that number of bedrooms, multiplied by a configured percentage. For example, if meter misclassification detector 622' is configured with a maximum percentile of 99%, then an anomaly will be recorded for each of the top 1% of data points, sorted by values of volume from highest to lowest, if the residential property where the associated water meter is installed has 2 bedrooms, and if the water usage is more than 200% of the expected water usage for a property with 2 bedrooms.

Figure 7A:
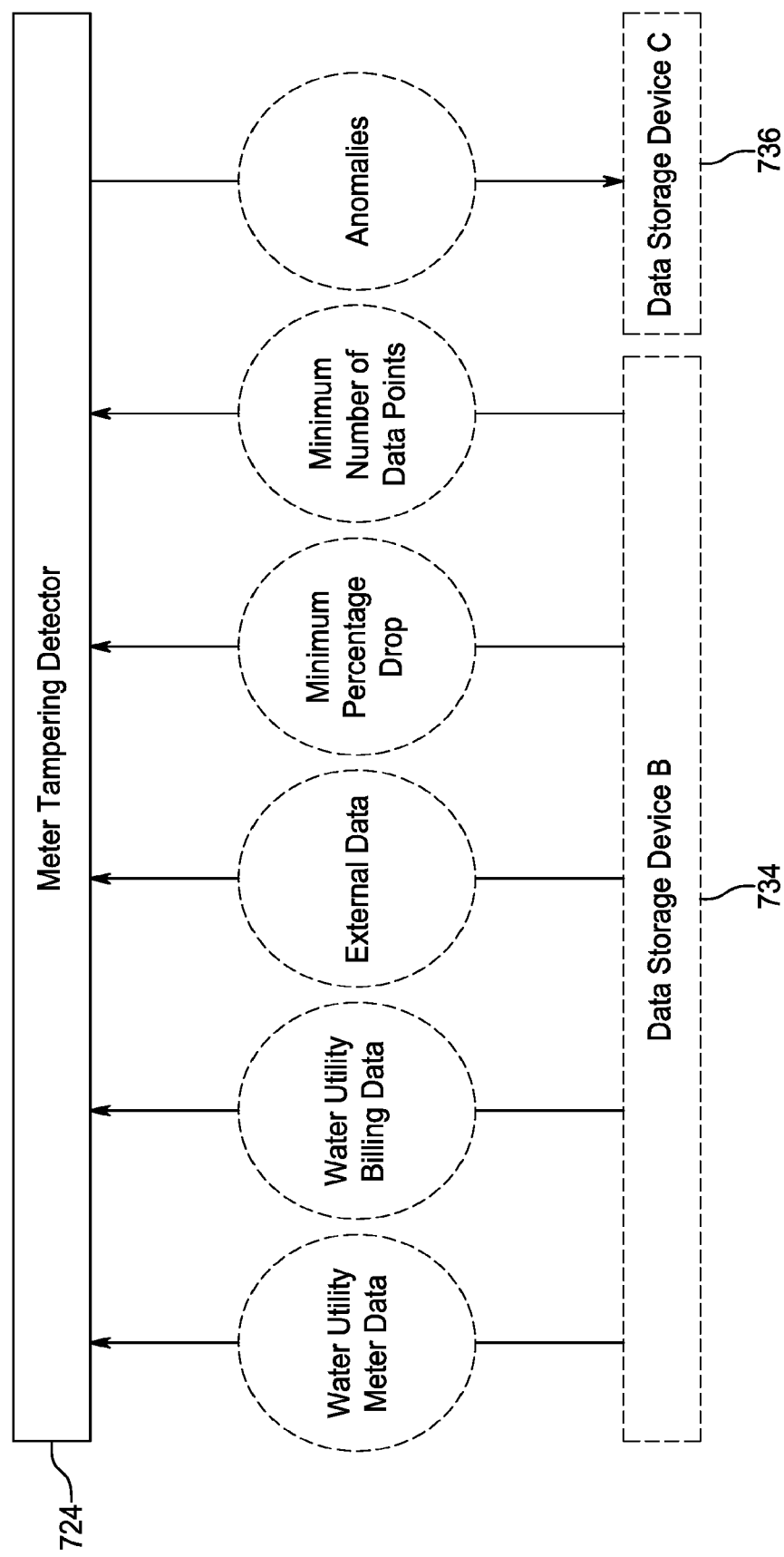
FIG. 7A is a block diagram showing a meter tampering detector module, according to one embodiment of the present arrangements, and depicting its relationships to certain inputs, outputs, and non-system devices associated with the present systems for detecting utility anomalies (e.g., system 100 of FIG. 1).

FIG. 7A is a block diagram showing a meter tampering detector 724, according to one embodiment of the present arrangements, and that depicts its relationships with certain related inputs, outputs, and non-system devices. Meter tampering detector 724, a data storage device B 734, and a data storage device C 736, are substantially similar to their counterparts in FIG. 1 (i.e., meter tampering detector 122, data storage device B 134, and data storage device C 136).

As shown in FIG. 7A, meter-tampering detector 724 is communicatively coupled to data storage device B 734 and data storage device C 736. Meter-tampering detector 724 searches water utility meter data, water utility billing data, and/or external data, located on data storage device B 734, for water meters matching a set of predefined criteria that indicate that a water meter may have been tampered with. Such predetermined criteria include a "minimum percentage drop", (i.e., a minimum drop in percentage values between consecutive time series data points for use of water at a particular location) and a "minimum number of data points".

Water utility meter data and water utility billing data may be presented as time series data measurements representing a sequence of values occurring at specified points in time. When a set of meter time series data measurements matching the criteria is located, meter-tampering detector 724 records an anomaly on data storage device C 736.

According to one embodiment of the present arrangements, meter tampering detector 724 records an anomaly for each set of meter time series measurements including at least one percentage drop, from one data point to the next data point, that exceeds the specified minimum percentage drop, with at least the specified minimum number of data points, if there is known to be no change in occupancy at the property where the associated water meter is installed. For example, if the data points in the time series measurements are equivalent to 12, 15, 11, 0, 1, and 0 kilogallons of water per month, and the specified minimum percentage drop is 50%, and the specified minimum number of data points is 10, and there has been no change in occupancy during the time period, then there are not enough data points, so no anomaly is recorded. As another example, if the data points in the time series measurements are 12, 15, 11, 0, 1, and 0 kilogallons of water per month, and the specified minimum percentage drop is 50%, and the specified minimum number of data points is 2, and there has been no change in occupancy during the time period, then the percentage drop between the third and fourth data points exceeds the minimum percentage drop and the number of data points exceeds the minimum number of data points, so one anomaly is recorded. As another example, if the data points in the time series measurements are 12, 15, 11, 0, 1, and 0 kilogallons of water per month, and the specified minimum percentage drop is 50%, and the specified minimum number of data points is 2, and there has been a change in occupancy during the time period, then even though the percentage drop between the third and fourth data points exceeds the minimum percentage drop and the number of data points exceeds the minimum number of data points, there was a change in occupancy during the time period, so no anomaly is recorded.

Figure 7B:
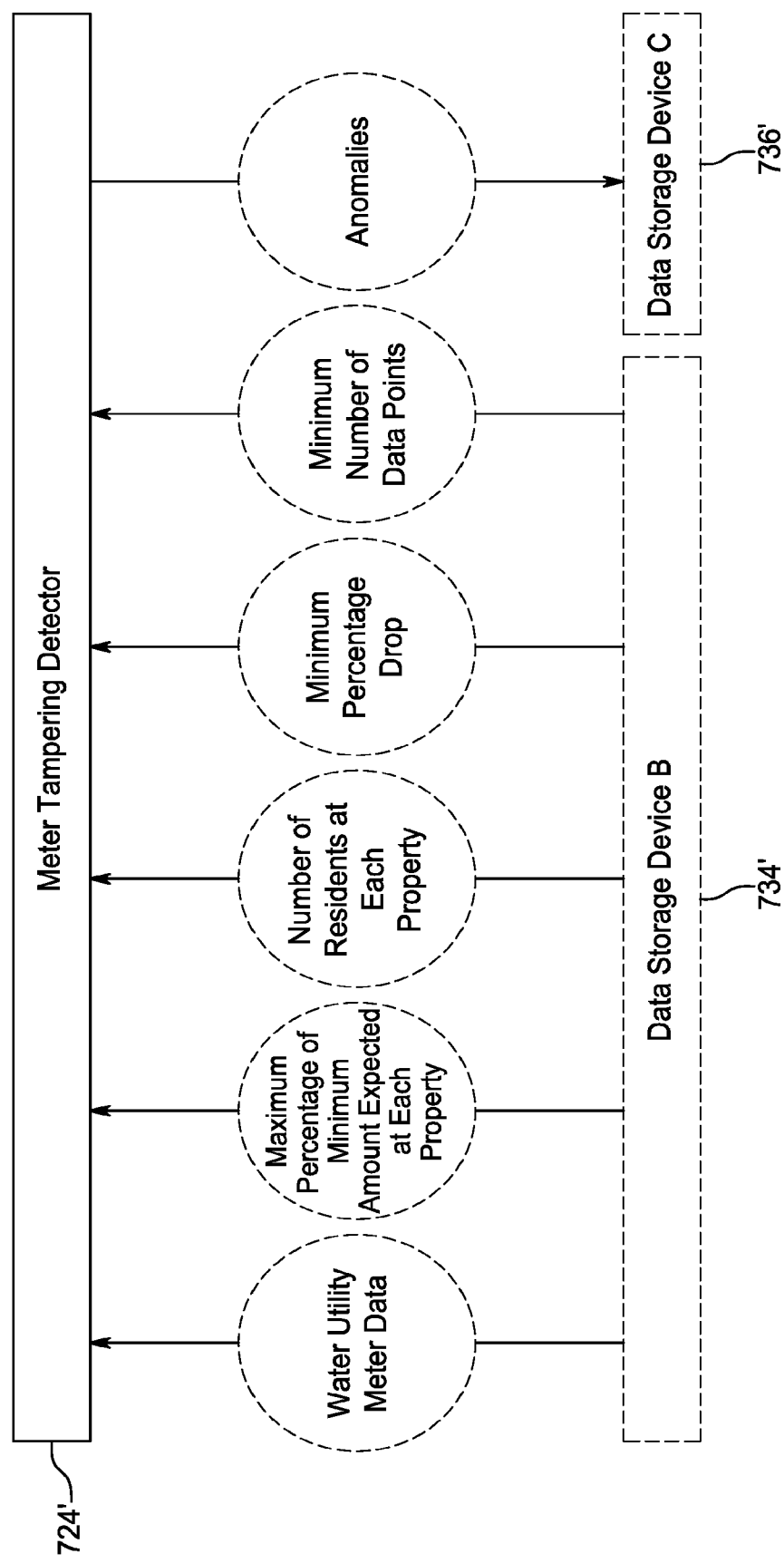
FIG. 7B is a block diagram showing a meter tampering detector module, according to an alternate embodiment of the present arrangements, and depicting its relationships to certain inputs, outputs, and non-system devices associated with the present systems for detecting utility anomalies (e.g., system 100 of FIG. 1).

FIG. 7B is a block diagram showing a meter tampering detector 724', according to an alternate embodiment of the present arrangements, and that depicts its relationships with certain related inputs, outputs, and non-system devices. Meter tampering detector 724', a data storage device B 734', and a data storage device C 736', are substantially similar to their counterparts in FIG. 7A (i.e., meter tampering detector 722, data storage device B 734, and data storage device C 736).

As shown in FIG. 7B, meter-tampering detector 724' is communicatively coupled to data storage device B 734' and data storage device C 736'. Meter-tampering detector 724' searches water utility meter data, located on data storage device B 734', for water meters matching a set of predefined criteria that indicate that a water meter may have been tampered with. Such predetermined criteria in FIG. 7B includes a "minimum percentage drop" and a "minimum number of data points" (both as described above with reference to FIG. 7A), as well as a "maximum percentage of minimum amount expected at each property" (i.e., a maximum percentage of a minimum amount of water use at each property"), and a "number of residents at each property".

Water utility meter data may be presented as time series data measurements representing a sequence of values occurring at specified points in time. When a set of meter time series measurements matching the criteria is located, meter-tampering detector 724' records an anomaly on data storage device C 736'. Meter tampering detector 724' records an anomaly for each set of meter time series measurements including at least one percentage drop, from one data point to the next data point, that exceeds the specified minimum percentage drop, with at least the specified minimum number of data points, if there is known to be no change in occupancy at the property where the associated water meter is installed, and if the average water consumption is less than the specified maximum percentage of the minimum amount of water use expected for the number of residents at the property. For example, if the data points in the time series measurements are 12, 15, 11, 0, 1, and 0 kilogallons of water per month, and the specified minimum percentage drop is 50%, and the specified minimum number of data points is 10, and there has been no change in occupancy during the time period, and the minimum amount of water consumption expected for the number of residents at the property is 20 kilogallons per month, and the specified maximum percentage of the minimum amount expected for the number of residents at the property is 40%, then there are not enough data points, so no anomaly is recorded. As another example, if the data points in the time series measurements are 12, 15, 11, 0, 1, and 0 kilogallons per month, and the specified minimum percentage drop is 50%, and the specified minimum number of data points is 2, and there has been no change in occupancy during the time period, and the minimum amount of water consumption expected for the number of residents at the property is 20 kilogallons per month, and the specified maximum percentage of the minimum amount expected for the number of residents at the property is 40%, then the percentage drop between the third and fourth data points exceeds the minimum percentage drop, the number of data points exceeds the minimum number of data points, and the average water consumption is no more than 40% of the minimum amount expected for the number of residents at the property, so an anomaly is recorded. As another example, if the data points in the time series measurements are 12, 15, 11, 0, 1, and 0 kilogallons of water per month, and the specified minimum percentage drop is 50%, and the specified minimum number of data points is 2, and there has been a change in occupancy during the time period, and the minimum amount of water consumption expected for the number of residents at the property is 20 kilogallons of water per month, and the specified maximum percentage of the minimum amount expected for the number of residents at the property is 40%, then even though the percentage drop between the third and fourth data points exceeds the minimum percentage drop and the number of data points exceeds the minimum number of data points, there was a change in occupancy during the time period, so no anomaly is recorded.

Figure 8A:
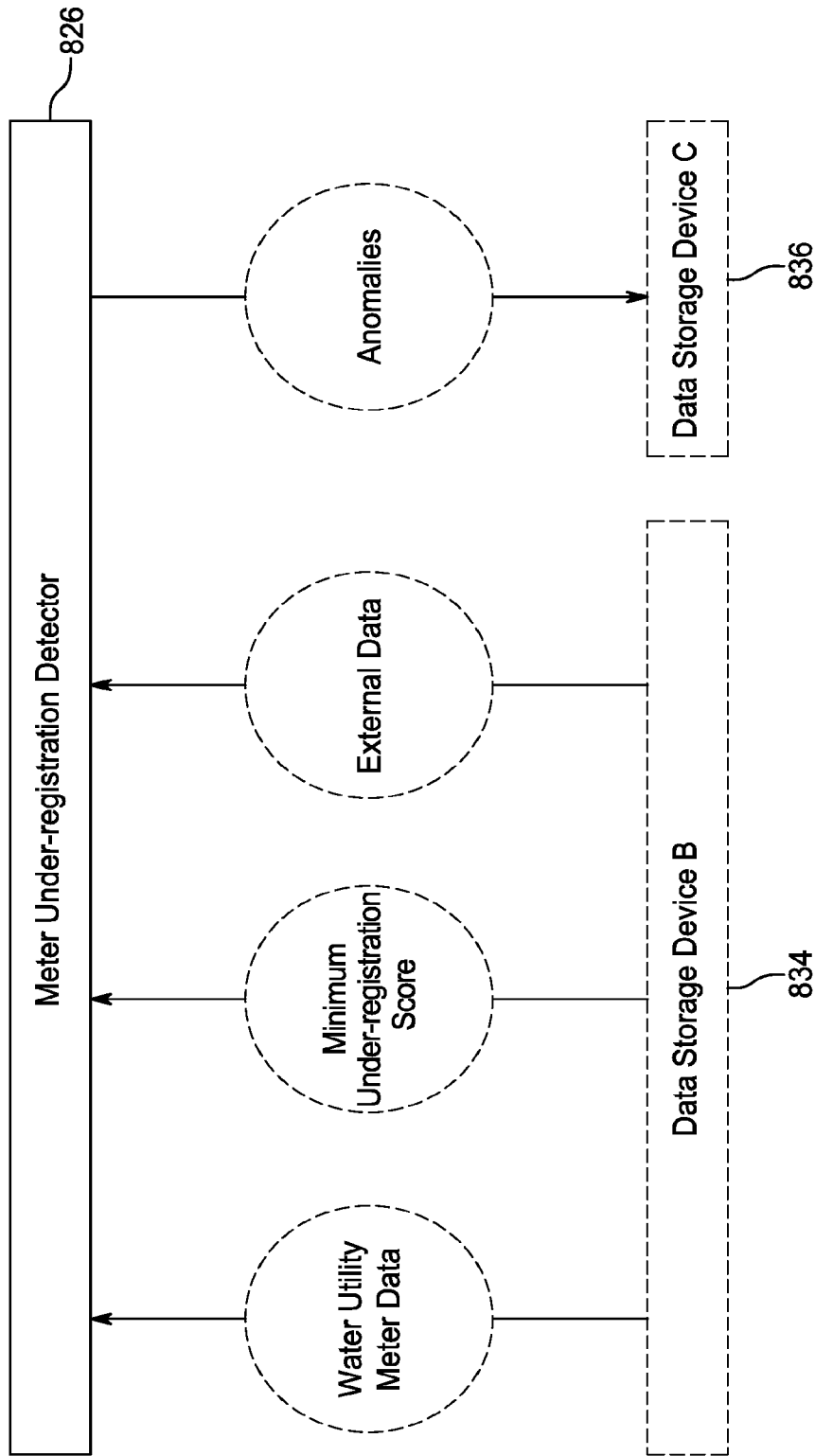
FIG. 8A is a block diagram showing a meter under-registration detector module, according to one embodiment of the present arrangements, and depicting its relationships to certain inputs, outputs, and non-system devices associated with the present systems for detecting utility anomalies (e.g., system 100 of FIG. 1).

FIG. 8A is a block diagram showing a meter under-registration detector 826, according to one embodiment of the present arrangements, and that depicts its relationship to certain related inputs, outputs, and non-system devices. Meter under-registration detector 826, a data storage device B 834, and a data storage device C 836, are substantially similar to their counterparts in FIG. 1 (i.e., meter under-registration detector 122, data storage device B 134, and data storage device C 136).

As shown in FIG. 8A, meter under-registration detector 826 is communicatively coupled to data storage device B 834 and data storage device C 836. Meter under-registration detector 826 searches water utility meter data and/or external data located on data storage device B 834 for water meters matching a set of predefined criteria that indicate that a meter may be under-registering an amount of water consumed at that location. Such predefined criteria include a "minimum under-registration score".

Water utility meter data may be presented as measurements data representing a sequence of values occurring at specified points in time. When a set of meter time series measurements matching the criteria is located, meter under-registration detector 826 records an anomaly on data storage device C 836.

According to one embodiment of the present arrangements, meter under-registration detector 826 calculates a correlation for each set of time series measurements as a value between −1 and 1, and uses this value, multiplied by −1, as the under-registration score for the time series measurements. Meter under-registration detector 826 is configured with the minimum under-registration score (as shown in FIG. 8A) above which detected utility anomalies will be recorded.

According to one embodiment of the present arrangements, meter under-registration detector 826 records an anomaly for each set of meter time series measurements having an under-registration score above the specified minimum score. For example, if the specified minimum under-registration score is 0.5, and the data points in the time series measurements are equivalent to 1, 1, 1, 1, and 1 kilogallons of water per month, then a correlation is calculated as 0, so no anomaly is recorded. As another example, if the specified minimum under-registration score is 0.5, and the data points in the time series measurements are equivalent to 10, 8, 6, 4, and 2 kilogallons of water per month, then a correlation is calculated as −1, and the under-registration score is calculated as 1, so one anomaly is recorded.

Figure 8B:
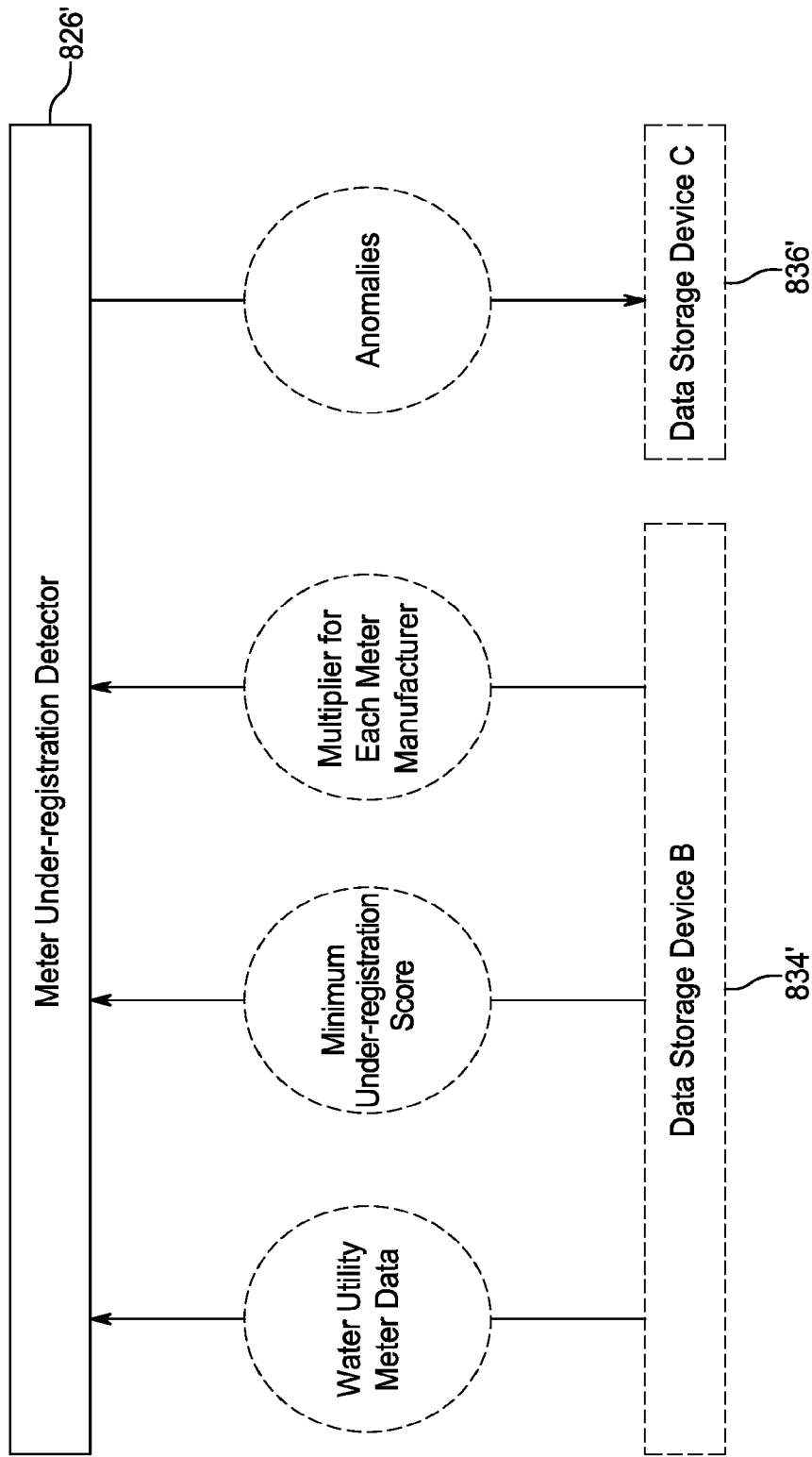
FIG. 8B is a block diagram showing a meter under-registration detector module, according to an alternate embodiment of the present arrangements, and depicting its relationships to certain inputs, outputs, and non-system devices associated with the present systems for detecting utility anomalies (e.g., system 100 of FIG. 1).

FIG. 8B is a block diagram showing a meter under-registration detector 826', according to an alternate embodiment of the present arrangements, and that depicts its relationship to certain related inputs, outputs, and non-system devices. Meter under-registration detector 826', a data storage device B 834', and a data storage device C 836', are substantially similar to their counterparts in FIG. 8A (i.e., meter under-registration detector 822, data storage device B 834, and data storage device C 836).

According to the embodiment of FIG. 8B, meter under-registration detector 826' records an anomaly for each meter set of time series measurements having an under-registration score above a "minimum under-registration score" (as described above with reference to FIG. 8A), and a "multiplier for each meter manufacturer", where an under-registration score is multiplied by the multiplier for each meter manufacturer based on the average rate of decay of a particular meter manufacturer's meter. For example, if the specified minimum under-registration score is 0.5, and the data points in the time series measurements are equivalent to 1, 1, 1, 1, and 1 kilogallons of water per month, and the specified multiplier for the meter manufacturer is 0.25, then the correlation is calculated as 0, and the under-registration score is calculated as 0, so no anomaly is recorded. As another example, if the specified minimum under-registration score is 0.5, and the data points in the time series measurements are equivalent to 10, 8, 6, 4, and 2 kilogallons of water per month, and the specified multiplier for the meter manufacturer is 0.25, then the correlation is calculated as −1, and the under-registration score is calculated as 0.25, so no anomaly is recorded. As another example, if the specified minimum under-registration score is 0.5, and the data points in the time series measurements are equivalent to 10, 8, 6, 4, and 2 kilogallons of water per month, and the specified multiplier for the meter manufacturer is 0.75, then the correlation is calculated as −1, and the under-registration score is calculated as 0.75, so one anomaly is recorded.

Figure 9A:
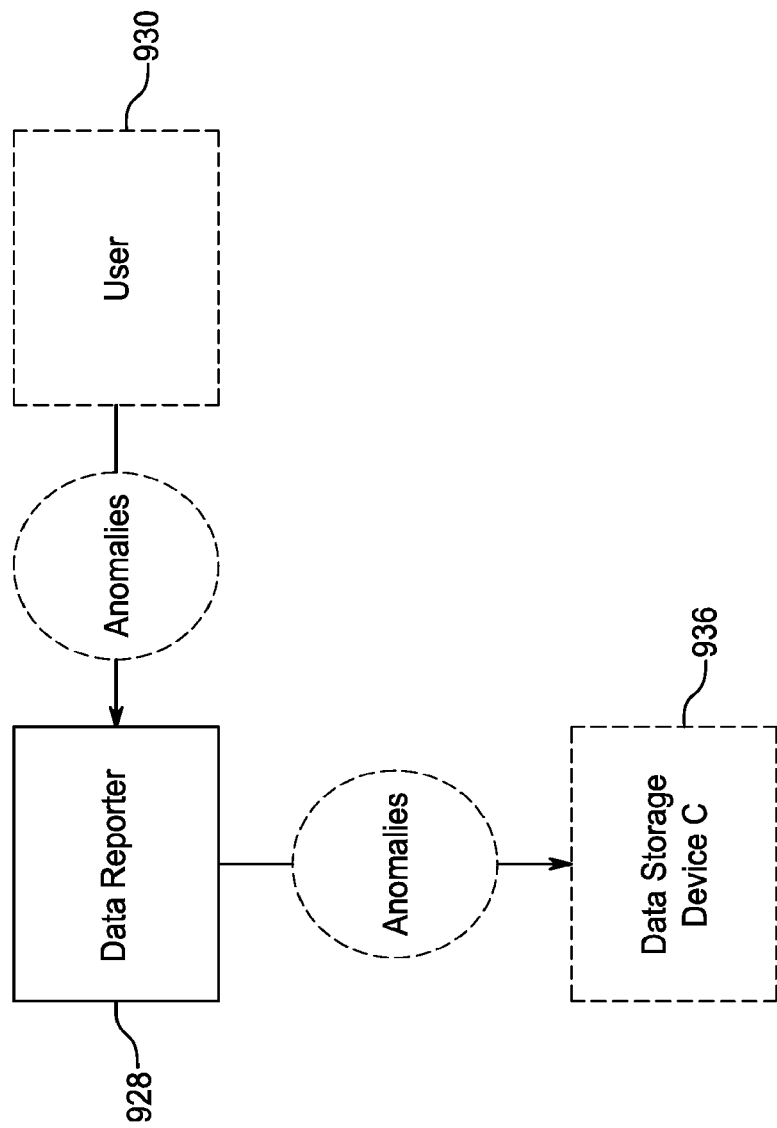
FIG. 9A is a block diagram showing a data reporter, according to one embodiment of the present arrangements, and depicting its relationships to certain inputs, outputs, and non-system devices associated with the present systems for detecting utility anomalies (e.g., system 100 of FIG. 1).

FIG. 9A is a block diagram showing a data reporter 928, according to one embodiment of the present arrangements, and that depicts its relationship to certain related inputs, outputs, and non-system devices. Data reporter 928, a user 930, and a data storage device C 936, are substantially similar to their counterparts in FIG. 1 i.e., data reporter 128, user 130, and data storage device C 136).

As shown in FIG. 9A, data reporter 928 is communicatively coupled to data storage device C 936. Data reporter 928 reads information about utility anomalies stored on data storage device C 936 and displays a list of one or more possible utility anomalies associated with a particular water meter. According to one embodiment of the present arrangements, a user, such as a representative of the water utility company or a water utility customer, connects to data reporter 928, preferably using a client device with a display screen, such as a smartphone, tablet, laptop computer, or desktop computer, to receive a list of one more possible utility anomalies on a display screen associated with the client device.

In certain embodiments of the present teachings, other information is presented on the display screen associated with data reporter 928. For example, a "certainty score", providing a measurement, preferably expressed as a percentage between 0% and 100%, of the likelihood that an anomaly identified by the systems of the present arrangements actually is an anomaly. A certainty score may be used to rank a detected anomaly from lowest to highest (i.e., from least likely actually to be an anomaly to most likely actually to be an anomaly).

In certain embodiments of the present teachings, a certainty score is calculated using data values associated with a particular anomaly (e.g., a volume of water consumed at a location). In other embodiments of the present arrangements, a certainty score is calculated using data values computed during anomaly detection (e.g., revenue associated with a volume of water).

A certainty score may be calculated by assigning, to a lower value, a score of 0%, and assigning, to a higher value, a score of 100%, and then interpolating certainty scores for data points that are between assigned values of 0% and 100%.

According to one embodiment of the present teachings, a lower value and a higher value that are assigned certainty scores of 0% and 100%, respectively, are theoretical values. For example, if a theoretical minimum rate of water consumption at a location is 0 gallons/day, then a certainty score of 0% is assigned; and if a theoretical maximum rate of water consumption at a location is 750 gallons/day, then a certainty score of 100% is assigned and intermediate values for water consumption between 0 gallons/day and 750 gallons/day are interpolated based on these theoretical minimum and maximum values. In an alternate embodiment of the present teachings, a lower value and a higher value that are assigned certainty scores of 0% and 100%, respectively, are actual or measured values. But, the intermediate values may still be obtained through interpolation as described above.

In other embodiments of the present teachings, regardless of whether theoretical or actual values are used, certainty scores of 0% and/or 100% are assigned to values that are not the lowest or highest values, respectively. For example, a middle data point value (i.e., not a lowest or highest data point value) may be assigned a certainty score of 0% or 100%.

Once certainty scores of 0% and 100% have been assigned, interpolating between these two scores is carried out to calculate a certainty score for any value that is between the lowest (i.e., assigned a certainty score of 0%) and highest (i.e., assigned a certainty score of 100%) values. Interpolating may be carried out by any method known to those of skill in the art. By way of example, interpolating may be linear, logarithmic, asymptotic, or the like.

A map, showing geographical information about a location where utility anomalies have been identified, may also be delivered to a data report for viewing by a user. The map may show a habitable structure that is associated with a water utility meter on the location. Habitable structure may indicate a footprint of a livable area inside the location address. The map may also show or otherwise indicate the nature of use of areas external to the habitable structure. Examples of external areas include parking spaces, desert type landscaping, and green landscaping. In certain embodiments of the present arrangements, a third-party map (e.g., a satellite image map from Google maps) is used, and such a map typically shows both habitable and external areas for a particular location address.

Figure 9B:
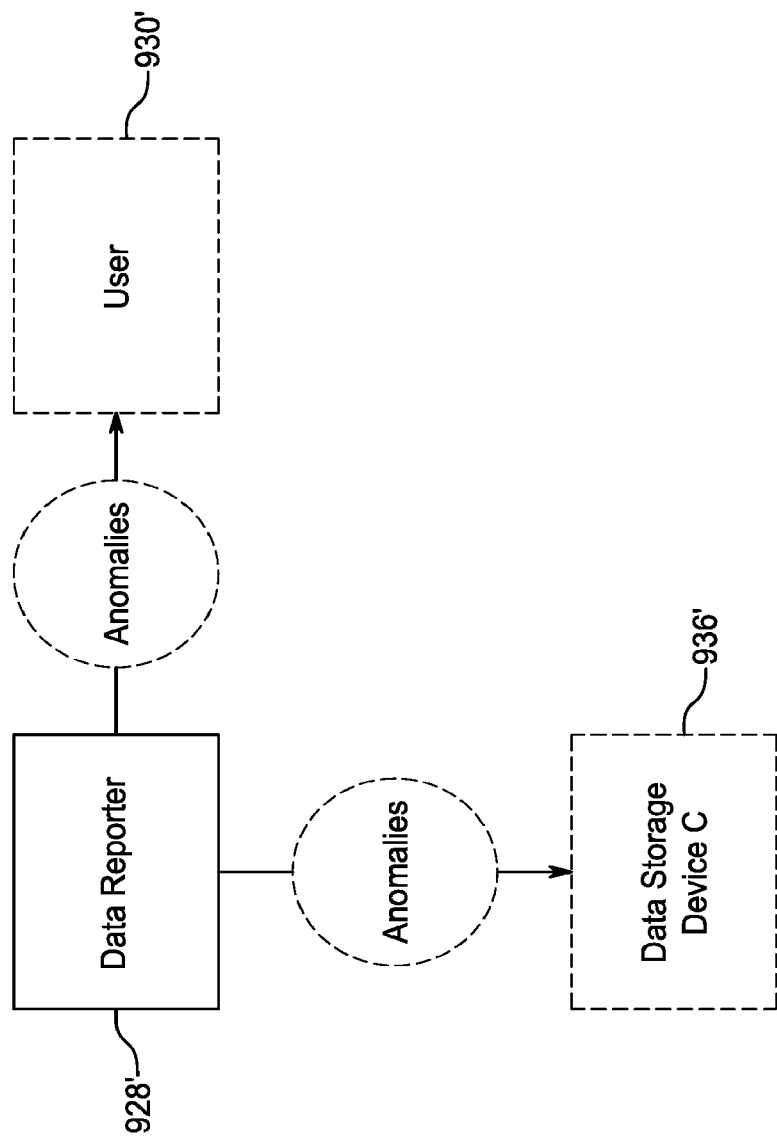
FIG. 9B is a block diagram showing a data reporter, according to an alternate embodiment of the present arrangements, and depicting its relationships to certain inputs, outputs, and non-system devices associated with the present systems for detecting utility anomalies (e.g., system 100 of FIG. 1).

FIG. 9B is a block diagram showing a data reporter 928', according to an alternate embodiment of the present arrangements, and that depicts its relationship to certain related inputs, outputs, and non-system devices. Data reporter 928', a user 930', and a data storage device C 936', are substantially similar to their counterparts in FIG. 9A (i.e., data reporter 928, user 930, and data storage device C 936).

According to the embodiment of FIG. 9B, data reporter 928 sends information about possible utility anomalies to a user's client device, to which it is communicatively coupled. According to another embodiment of the present arrangements, a computer is communicatively coupled to Data Storage Device C, and is also linked to a printer via a network or via a direct connection. The computer instructs the printer to create a printed report about one or more possible utility anomalies that have been detected.

Figure 10:
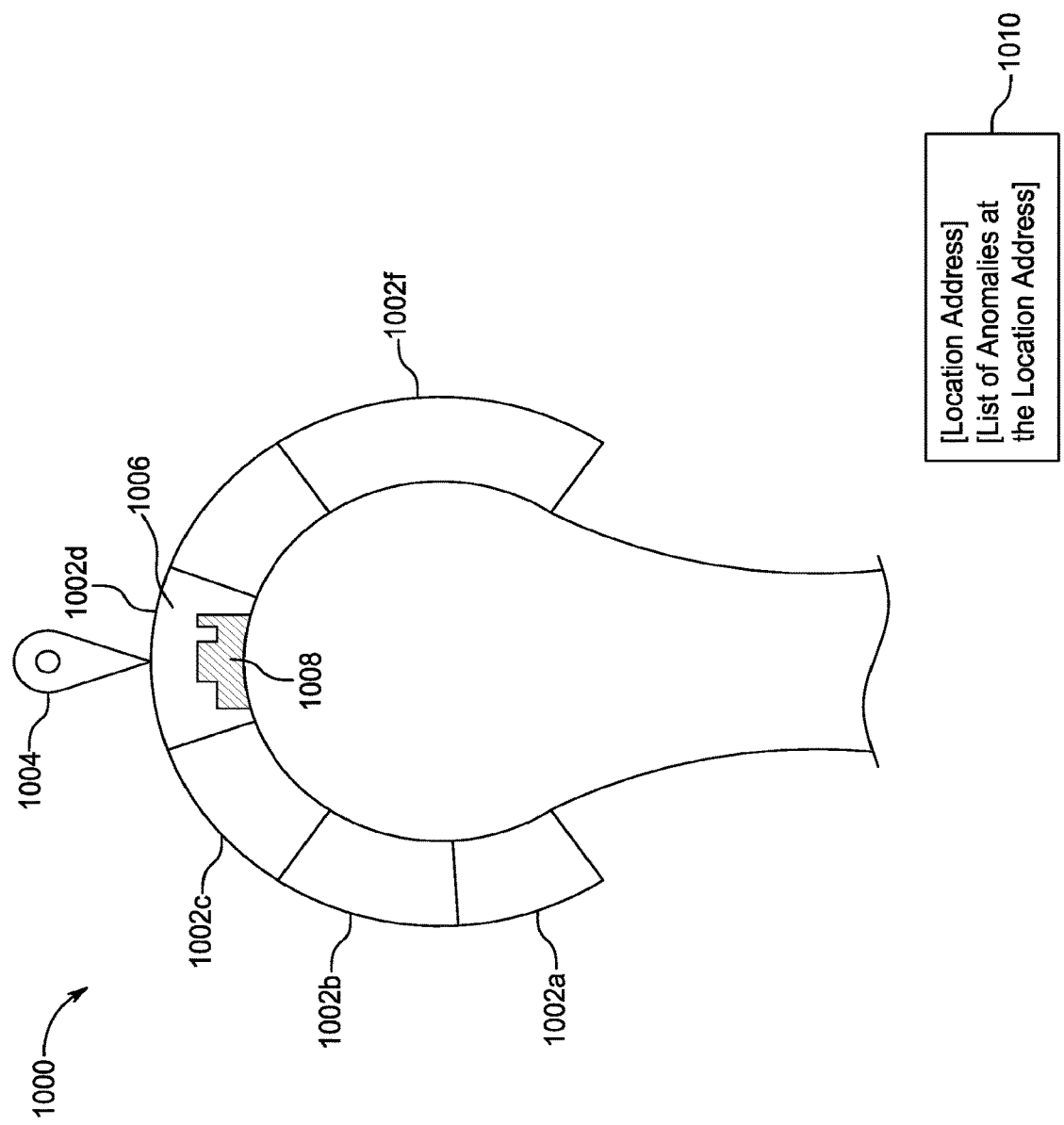
FIG. 10 is an illustration of a user interface, according to one embodiment of the present arrangements and that shows a map with a non-selectable flag icon and a dialog box.

FIG. 10 shows a user interface 1000, according to one embodiment of the present arrangements, depicting locations of property lots on a map and a dialog box that presents information about utility anomalies associated with at least one of those location addresses. Display screen 1000 includes a lot 1002a, a lot 1002b, a lot 1002c, a lot 1002d, a lot 1002e, a lot 1002f, a flag icon 1004, an external area 1006, a habitable structure 1008, and a dialog box 1010.

User interface 1000 may be or include an electronic display screen associated with a client device that is capable of receiving information about utility anomalies, either directly or indirectly, from a system for detecting utility anomalies (e.g., system 100 of FIG. 1). According to preferred embodiment of the present arrangements, a client device associated with user interface is communicatively coupled to a data reporter (e.g., data reporter 928 of FIG. 9A), for receiving information about utility anomalies from systems of the present arrangements (e.g., system 100 of FIG. 1).

The map depicted on user interface 1000 shows a series of locations, i.e., lots 1002a, 1002b, 1002c, 1002d, 1002e, and 1000f, arranged along a cul-de-sac. Preferably, one or more of lots 1002a-100f are associated with a water utility meter that measures water consumption at each location.

As shown in FIG. 10, flag icon 1004 abuts and/or otherwise emanates from a boundary of lot 1002d. Preferably, use of flag icon 1004 in such manner at lot 1002d indicates that one or more utility anomalies have been detected on a particular location address, lot 1002d, by systems of the present arrangements.

External area 1006 and habitable structure 1008 are also shown in lot 1002d. Habitable structure 1008, at this location address, may represent a residence, a commercial building, or any other building structure associated with water consumption on lot 1002d. Likewise, external area 1006, at this location address, may be used to show certain other features that provide additional information about water use on lot 1002d. For example, though not shown on FIG. 10, external area 1006 may show one or more pools on lot 1002d, indicating that water use at that location may be higher than would otherwise be expected.

Dialog box 1010 provides additional information, in narrative form, about one or more utility anomalies associated with lot 1002d (i.e., the location identified by flag icon 1004). As shown in FIG. 10, dialog box 1010 may provide a location address and a list of utility anomalies associated with the location address. Other information may optionally be included, such as a percentage certainty score associated with one or more utility anomalies, costs savings, and other information that may be relevant to a water utility company, a water utility customer, and/or a third-party worker who has been hired to investigate and/or repair one or more utility anomalies at lot 1004d. In such manner, information about utility anomalies is promptly conveyed to a user, who may then take steps to remediate such problems.

In certain embodiments of the present arrangements, color-coding may be used to convey certain information on display screen 1000 about utility anomalies and/or a particular location where utility anomalies have been detected. For example, flag icon 1004 and/or a location (e.g., lot 1002d) may be color coded to convey a measure of certainty score (e.g., use of the color red may indicate a certainty score greater than 90%). As another example, flag icon 1004 and/or other objects on a map may be presented in a particular color to identify utility anomalies that require immediate attention. As another example, flag icon 1004 and/or other objects on a map may be presented in a particular color to identify a location where systems of the present arrangements did not identify any anomaly. The present systems for detecting and reporting utility anomalies contemplate any such use of color coding on a user interface to convey information about one or more utility anomalies and/or a location associated with one or more utility anomalies. Further, the present systems for detecting and reporting utility anomalies contemplate the use of other techniques and features that highlight utility anomaly information, such as flashing text and/or exclamation marks.

Figure 11:
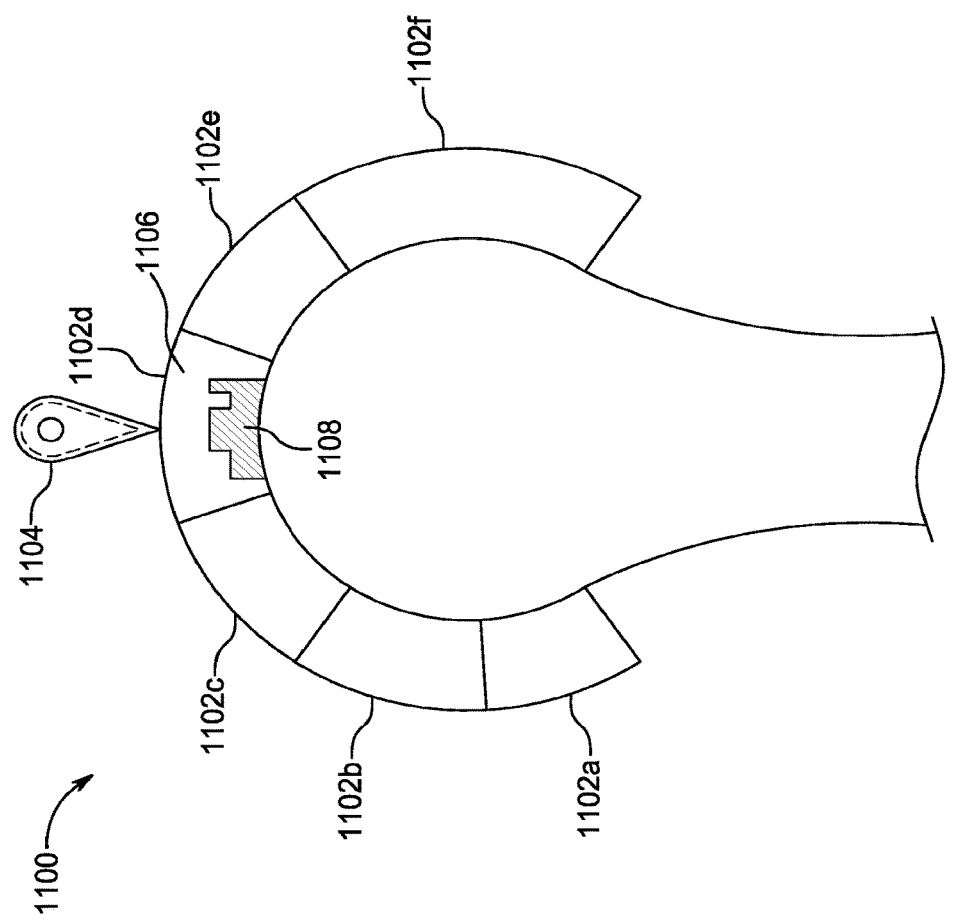
FIG. 11 is a diagram of another user interface, according to an alternate embodiment of the present arrangements and that shows a map with a selectable flag icon and a dialog box.

FIG. 11 shows a user interface 1100, according to another embodiment of the present arrangements, depicting locations on a map and a dialog box that presents information about utility anomalies associated with at least one of those location addresses. Lots 1102a, 1102b, 1102c, 1102d, 1102e, and 1002f, an external area 1006, and a habitable structure 1108, are substantially similar to their counterparts in FIG. 1100 (i.e., lots 1002a, 1002b, 1002c, 1002d, 1002e, and 1000f, and habitable structure 1008). FIG. 11 also shows a flag icon 1104, which unlike flag icon 1004 of FIG. 10, is depicted as selectable by a user (i.e., as indicated by dashed lines shown inside flag icon 1104). Further, FIG. 11 shows a dialog box 1112, which lists certain information about one or more utility anomalies detected at lot 1104d.

According to one embodiment of the present arrangements, selection, by a user, of selectable flag icon 1104 on a user interface, prompts a user device to present, on the user interface, dialog box 1112. Dialog box 1112 may then present certain information about one or more one or more utility anomalies associated with lot 1002*d* By way of example, dialog box 1112 may present a list of utility anomalies, cost savings associated with remediating one or more of utility anomalies, percentage certainty score associated with one or more utility anomalies, recommended actions to take regarding one or more utility anomalies, date of completion of remediation, status of remediation efforts, further testing required at water meter location, and individual worker(s) assigned to remediation of one or more utility anomalies. In such manner, the systems of the present arrangements provide immediate guidance to a water utility company, a customer, and/or a third-party worker regarding the nature, status, and effects water meters that may be defective in a manner that produces utility anomalies.

Use of selectable flag icon 1104 provides certain advantages. For example, a selectable flag icon allows user to request information to be presented on an as-needed basis. As another example, on maps identifying utility anomalies at multiple locations using multiple selectable flag icons, any on flag icon may be selected by a user to provide information about utility anomalies at that particular location.

Figure 12A:
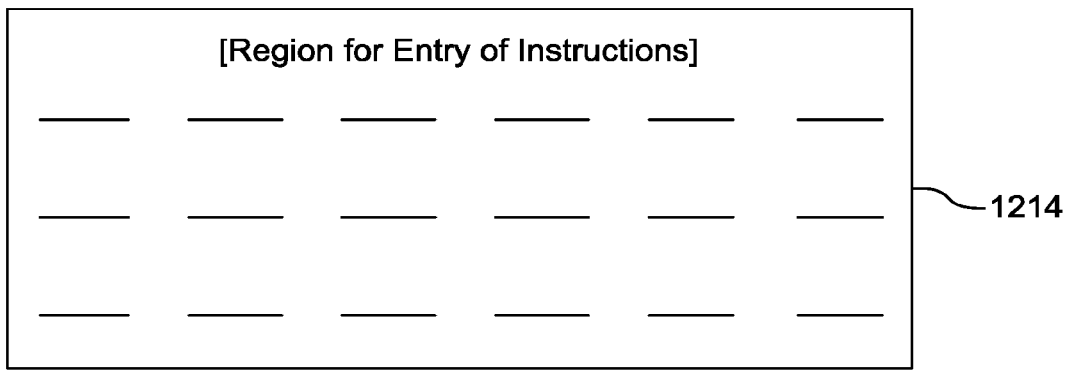
FIG. 12A is a diagram of yet another user interface, according to another alternate embodiment of the present arrangements and that shows a dialog box for entering instruction to a worker.

FIG. 12A shows a dialog box 1214, according to one embodiment of the present arrangements, for providing entry of instructions regarding one or more utility anomalies identified at a location (e.g., lot 1004*d* of FIG. 10). Unlike the dialog boxes of FIGS. 10 and 11, dialog box 1214 of FIG. 12 is provided so that a user may input instruction regarding utility anomalies at a location in dialog box 1214. In other words, dialog box 1214 is configured to receive inputs from a user. By way of example, a representative of a water utility company may provide instructions, in dialog box 1214, that may later be accessed by a worker who has been requested to investigation and/or remediate one or more utility anomalies. By way of example, instructions and/or information regarding steps to be taken to repair or replace a water meter, location of a water meter on property, potential hazards at a location, water meter identification number, water meter manufacturer, water meter type, installation date of a water meter, and/or a premise number of a location or lot (i.e., an identification number of location as designated by a utility company), may be input by one user into dialog box 1214, for later reference by another user, or that use.

According to one embodiment of the present arrangements, dialog box 1214 is presented on client device user interface in response to an action taken by a user. For example, dialog box 1214 may be presented upon user clicking hyperlinked text (e.g., hyperlinked text from dialog box 1100 of FIG. 11) or a selectable icon (e.g., selectable flax icon 1104 of FIG. 11).

Figure 12B:
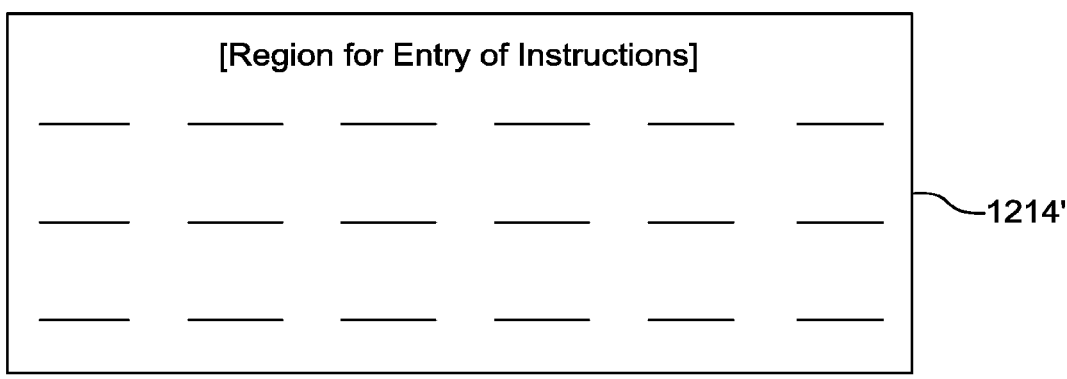
FIG. 12B is a diagram of yet another user interface, according to another embodiment of the present arrangements and that shows the dialog box of FIG. 12A adjacent to a different dialog box that is used for receiving remarks or comments from a worker regarding remediation of one or more utility anomalies.
Figure 12B:
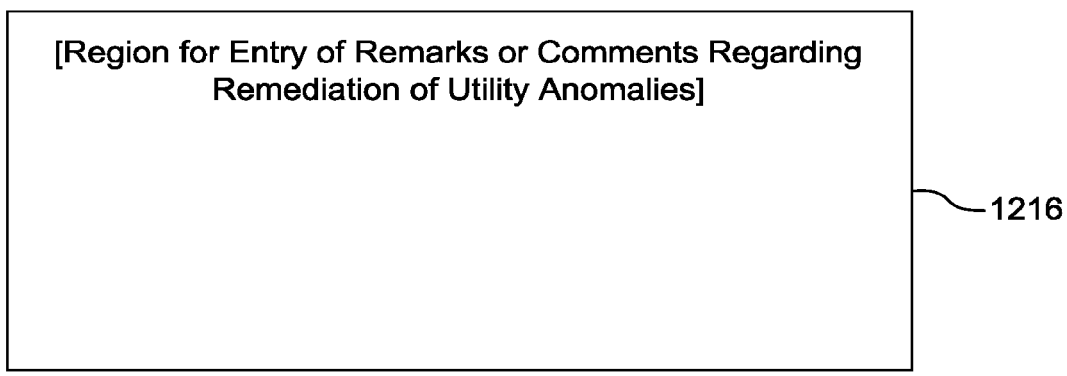

FIG. 12B shows a dialog box 1214' and a dialog box 1216, according to another embodiment of the present arrangements, for providing entries and instructions related to remediation of one or more utility anomalies. Dialog box 1214' is substantially similar to its counterpart in FIG. 12A (i.e., dialog box 1214). Dialog box 1216, according to one embodiment of the present arrangements, is presented, upon selection by a user, on a user device display screen for entry of remarks or comments regarding remediation of one or more utility anomalies.

For example, a worker who has been hired to remediate utility anomalies at a location may use dialog box 1214' to receive certain instructions about the utility anomalies. Then, before, during, or following the worker's investigation of and/or attempt to remediate utility anomalies, the worker may use dialog box 1216, on a user device, to input further instructions, observations, conclusions, and/or comments related to utility anomalies. For example, a worker may input information such as tools to bring, spare parts to bring, meter type to bring for replacement, and meter size to bring for replacement, status of attempts at remediation, further information about externals areas or habitable structures associated with utility anomalies.

Further information may also be transmitted to a user interface (e.g., display screen 1100 of FIG. 11). For example, notice that remediation is complete at a location, notice that remediation is delayed at a location, and cost saving expected or resulting from remediation, may be transmitted. Further, related information may also be presented in other forms. For example, an estimated value of costs savings at a location address resulting from remediation may be presented on a billing statement associated with that location address.

Figure 13:
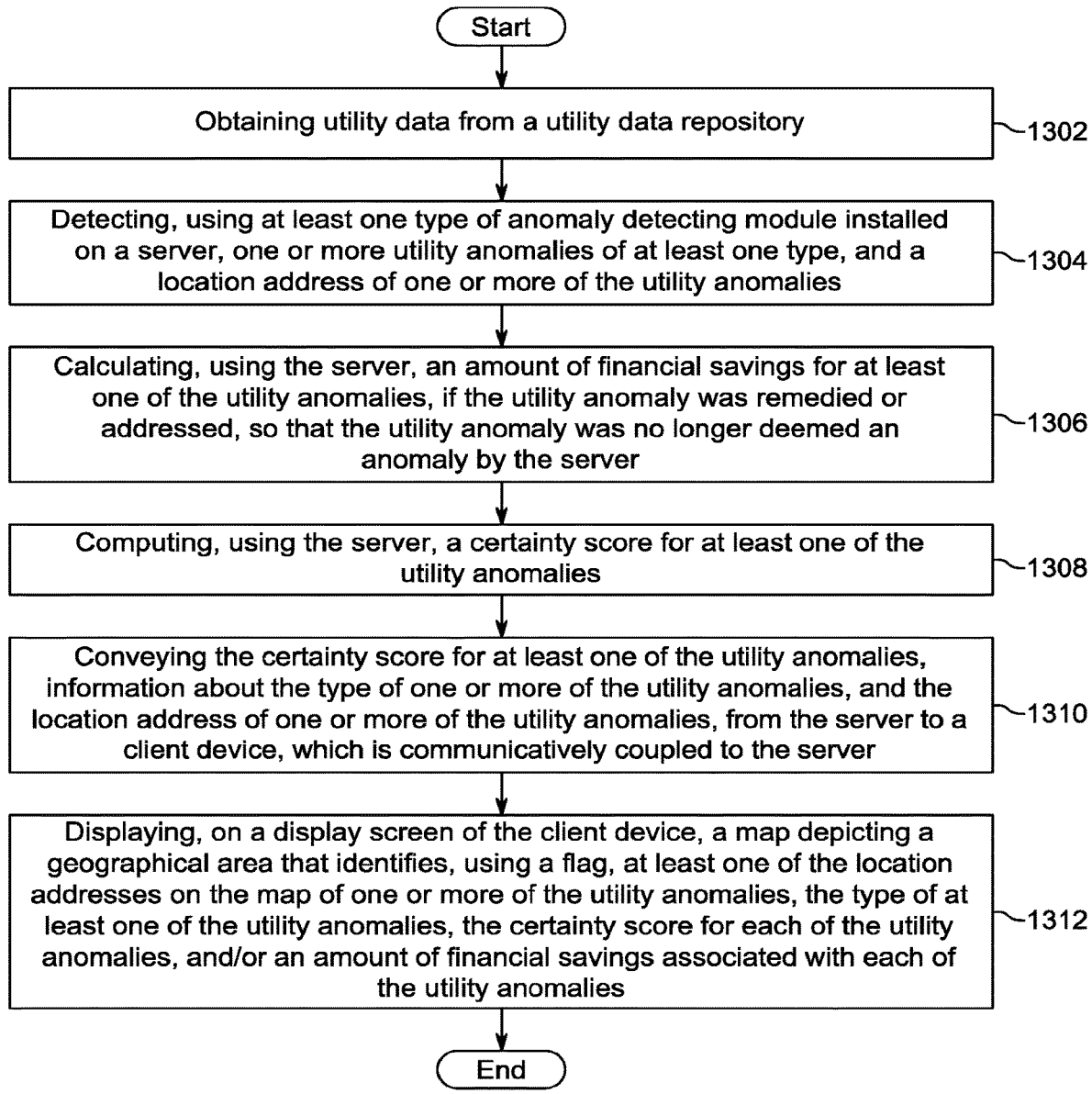
FIG. 13 is a process flow diagram showing certain salient steps of a process, according to one embodiment of the present teachings, for utility intervention.

FIG. 13 is a flowchart showing certain salient steps of a process 1300, according to one embodiment of the present teachings, for utility intervention. "Utility intervention" may be thought of as certain steps taken by a utility company to detect, report, and/or remediate one or more utility anomalies associated with a water meter at a particular location. Preferably, utility intervention includes using the present systems for detecting and reporting utility anomalies (i.e., system 100 of FIG. 1).

Process 1300 begins with a step 1302, which includes obtaining utility data from a utility data repository. Utility data may be thought of as any type of data associated with detecting utility anomalies in water meters (e.g., water utility meter data, water utility billing data, and/or one or more types of external data).

Obtaining in step 1302 may include obtaining water utility meter data from a water utility meter data repository (e.g., water utility meter data repository 104 of FIG. 1), obtaining water utility billing data from a water utility meter billing depository (e.g., water utility billing data repository 106 of FIG. 1), and/or obtaining one or more types of external data from one or more types of external data repositories (e.g., first external data repository 108 and second external data repository 110 of FIG. 1).

Preferably, utility data obtained in step 1302 is received by a data receptor (e.g., data receptor 112 of FIG. 1), which then organizes and/or advances such utility data for storage in a data storage device (e.g., data storage device A 132 of FIG. 1), where it is conveyed for further processing by systems of the present teachings (e.g., system 100 of FIG. 1).

In certain embodiments of the present teachings, obtaining in step 1302 includes modifying and/or transforming utility data into an acceptable form. In other words, prior to advancing to step 1304, external data may be in an original form that require modification into a modified, or acceptable, form that is more amenable to processing in downstream steps of process 100. Preferably, such modification is carried out by a data transformer (e.g., data transformer 114 of FIG. 1). After modification into an acceptable form, resulting modified utility data may be stored on a data storage device (e.g., data storage device B 134 of FIG. 1), where it is accessible for further processing in subsequent steps.

Next, a step 1304 includes detecting, using at least one type of anomaly-detecting module installed on a server (e.g., meter under-sizing detector module 118, meter over-sizing detector module 120, meter misclassification detector module 122, and/or meter tampering detector module 124 of FIG. 1), one or more utility anomalies of at least one type, and a location address of one or more of the utility anomalies (e.g., a location address for lot 1002*d* of FIG. 10). As explained above with reference to FIGS. 1 and 4A-8B, each anomaly-detecting module is configured with certain predetermined thresholds that are used, when accessing utility data (e.g., utility data delivered from and/or accessed in data storage device B 134 of FIG. 1), to carry out certain calculations to detect the presence of one or more utility anomalies. Step 1304 may also include producing a list of one or more utility anomalies detected. Such list may be stored on a data storage device (e.g., data storage device C 136 of FIG. 1). Associated data and information may also be stored on the same, or a different, data storage device.

Next, a step 1306 includes calculating, using the server, an amount of financial savings for at least one of the utility anomalies, if the utility anomaly was remedied or addressed, so that the utility anomaly was no longer deemed an anomaly by the server. The present teachings recognize that further data and information may be input into, or otherwise accessed by, certain components related to a system for detecting and reporting utility anomalies, for further processing of modified utility data. For example, a "financial savings module" may be employed by systems of the present teachings to carry out calculations of cost savings associated with remediating one or more utility anomalies detected. In other words, if a water utility meter anomaly is detected, systems of the present teachings may be configured to provide and estimate of how much cost savings a customer and/or a water utility company can save and/or earn if the water utility meter anomaly would no longer be deemed an anomaly by systems of the present teachings.

Next, a step 1308 includes computing, using the server, a certainty score for at least one of the utility anomalies. The present teachings recognize that components of systems of the present teachings (e.g., system 100 of FIG. 1) and/or additional components not shown herein (e.g., a certain score module) may be used by a server to calculate a percentage score reflecting certainty that a water utility meter anomaly detected by systems of the present teachings is, in fact, an anomaly. Such information may be useful to a water utility company in determining what further steps should be taken. For example, if a water utility meter anomaly is detected, but a certainty score associated with the anomaly is relatively low, then the water utility company may be prompted to take certain further steps (e.g., an on-site investigation) to confirm the existence of the anomaly before taking remediating action. Further, a certainty score may also be used to adjust a level of cost savings estimated for remediating a water utility meter data anomaly.

Data and information related to a certain score may then be delivered to a data storage device (e.g., data storage device C 136 of FIG. 1) for storage and downstream conveyance for further processing and/or conveyance.

Next, a step 1310 includes conveying the certain score for at least one of the utility anomalies, information about the type of one ore more of the utility anomalies, information about the type of one or more of the utility anomalies, and the location address of one or more of the utility anomalies, and the location address of one or more of the utility anomalies, from the server to a client device, which is communicatively coupled to the server. The client device may include an integrated or otherwise attached user interface that displays such information in a dialog box (i.e., dialog box 1112 of FIG. 11). Such information, identifying the location address of one or more of the utility anomalies, a certainty score associated with one or more of the utility anomalies, and other information related to one or more of the utility anomalies, may prompt further action to investigate and/or remediate a utility anomaly. The present teachings recognize that by providing such information quickly to a water utility company, a customer, or a third party, remediation efforts may be carried out almost immediately, providing additional opportunities for cost and water savings.

Next, a step 1312 includes displaying, on a user interface of the client device, a map depicting a geographical area that identifies, using a flag, at least one of the location addresses on the map of one or more of the utility anomalies, the type of at least one of the utility anomalies, the certainty score for each of the utility anomalies, and/or an amount of financial savings associated with each of the utility anomalies. For example, as shown in the map depicted on display screen 1000 of FIG. 10, a flag icon (e.g., flag icon 1004 of FIG. 10) to identify a location where an anomaly has been detected (e.g., a location address associated with lot 1002*d* of FIG. 10). A dialog box (e.g., dialog box 1006 of FIG. 10) may be displayed on or near the map such that information about the flagged property is provided in the dialog box, which may include a location address, a list of utility anomalies detected, a certainty score associated with one or more utility anomalies, as well as other related information about the utility anomalies. In certain embodiments of the present teachings, a flag icon may be selectable (e.g., selectable flag icon 1104 of FIG. 11). Selecting the flag icon may then prompt the appearance of a dialog box displaying certain information about one or more utility anomalies identified by systems of the present teachings (e.g., dialog box 1106 of FIG. 11).

The present teachings recognize that subsequent steps may be taken to further address the existence of one or more utility anomalies that have been detected by systems of the present teachings. For example, a dialog box may be shown on a client device display screen that provides a region for entry of instructions associated with utility anomalies (e.g., dialog box 1214 of FIG. 12A). Further, another dialog box may be presented on a display screen that provides a region for entry of instructions for a user (e.g., a third-party worker) who will or has investigate utility anomalies detected at a particular location (e.g., dialog box 1216 of FIG. 12B).

Although illustrative embodiments of the present arrangements and teachings have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method of utility intervention, said method comprising:
   obtaining utility data from a utility data repository;
   detecting, using at least one type of anomaly-detecting module installed on a server, one or more utility anomalies of at least one type and a location address of one or more of said utility anomalies;
   calculating, using said server, an amount of financial savings for at least one of said utility anomalies if said utility anomaly was remedied or addressed so that said utility anomaly was no longer deemed an anomaly by said server;

computing, using said server, a certainty score for at least one of said utility anomalies and wherein said certainty score is a measure of certainty that said utility anomaly, obtained from said detecting, is indeed an anomaly, and not a false positive result;

conveying said certainty score for at least one of said utility anomalies, infomlation about said type of one or more of said utility anomalies, and said location address of one or more of said utility anomalies from said server to a client device, which is communicatively coupled to said server; and displaying, on a display screen of said client device, a map depicting a geographical area that identifies, using a flag presented as a selectable icon, at least one of said location address on said map of one or more of said utility anomalies and said type of at least one of said utility anomalies;

presenting information, upon user's selection of said selectable icon for said flag, regarding remediation of said utility anomaly that includes said location address on said map of one or more of said utility anomalies, said type of at least one of said utility anomalies, said certainty score for each of said utility anomalies, and amount of said financial savings associated with each of said utility anomalies.

2. The method of utility intervention of claim 1, further comprising transforming, using a data transformer module, said utility data obtained from said utility data repository to put m acceptable form, which allows said detecting to be carried out.

3. The method of utility intervention of claim 2, wherein in acceptable form, said location addresses in said utility data are converted to same format, and/or timestamps in said utility data are converted to time values in same time zone.

4. The method of utility intervention of claim 3, further comprising storing, in a data storage device, said utility data in acceptable form.

5. The method of utility intervention of claim 4, further comprising conveying said utility data in acceptable form from said data storage device to said server to cany out said detecting.

6. The method of utility intervention of claim 1, wherein during said detecting, said anomaly-detecting module used includes one module chosen from a group comprising meter under sizing detector, meter over sizing detector, meter misclassification detector, meter tampering detector, and meter under registration detector.

7. The method of utility intervention of claim 6, wherein said meter under sizing detector detects whether a utility meter at said location address has a size smaller than a predetermined size for said utility meter, wherein said meter over sizing detector detects whether said utility meter at said location address has a size larger than said predetermined size for said utility meter, wherein said meter misclassification detector detects whether said utility meter at said location address is misclassified, wherein said meter tampering detector detects whether said utility meter at said location address has been tampered with, and wherein said meter under registration detector detects whether said utility meter at said location address is under registering amount of use of said utility at said location address; and wherein said utility meter measures amount of use of said utility at said location address.

8. The method of utility intervention of claim 1, wherein said conveying includes sending said certainty score for at least one of said utility anomalies and said information about said type of one or more of said utility anomalies, from said server to a memory and then from said memory to a data reporter.

9. The method of utility intervention of claim 1, wherein said location address conveys information about boundary of a habitable area and information about external area that is outside said habitable area.

10. The method of utility intervention of claim 9, wherein said external area conveys qualitative information about nature of use of said location address and/or about extent of consumption of said utility due to nature of external area, and wherein said qualitative information allows user of said client device to deduce extent of consumption of said utility in said habitable area.

11. The method of utility intervention of claim 10, wherein said flag is presented as a selectable icon on said user interface of said client device.

12. The method of utility intervention of claim 10, wherein said presenting information includes providing instruction for remediating said utility anomaly.

13. The method of utility intervention of claim 10, further comprising presenting an input region, on said user interface, for receiving remediation information of said utility anomaly.

14. The method of utility intervention of claim 13, further comprising transmitting said remediation information, through a text or an electronic mail address associated with said location address and that presents one or more available times to perform remediation at said location address.

15. The method of utility intervention of claim 13, further comprising receiving one or more selected available times, for remediation at said location address, from said text or said electronic mail address associated with said location address.

16. The method of utility intervention of claim 13, further comprising conveying said selected available times, to carry out remediation at location address, to a remediation entity or worker.

17. The method of utility intervention of claim 16, further comprising transforming display of flag from a selectable icon to a non-selectable icon and/or transmitting notice, through a text or an electronic email address associated with said location address, that said remediation entity or worker has completed said remediation at said location address.

18. The method of utility intervention of claim 17, further comprising transmitting an estimated value for cost savings, at said location address, resulting from said remediation at said location address, to said client device.

19. The method of utility intervention of claim 17, further comprising providing, in a billing statement associated with said location address, an estimated value of cost saving, at said location address, resulting form said remediation at said location address.

* * * * *